(12) United States Patent
De Schrijver et al.

(10) Patent No.: US 10,241,872 B2
(45) Date of Patent: Mar. 26, 2019

(54) HYBRID DISTRIBUTED STORAGE SYSTEM

(71) Applicant: Amplidata N.V., Ghent (BE)

(72) Inventors: Frederik De Schrijver, Wenduine (BE); Bastiaan Stougie, Melle (BE); Koen De Keyser, Sint-Denijs Westrem (BE); Wim De Wispelaere, Ghent (BE)

(73) Assignee: Amplidata N.V., Ghent (BE)

( * ) Notice: Subject to any disclaimer, the term of this patent is extended or adjusted under 35 U.S.C. 154(b) by 627 days.

(21) Appl. No.: 14/814,264

(22) Filed: Jul. 30, 2015

(65) Prior Publication Data

US 2017/0031778 A1 Feb. 2, 2017

(51) Int. Cl.
| | |
|---|---|
| *G06F 11/14* | (2006.01) |
| *G06F 3/06* | (2006.01) |
| *G06F 11/10* | (2006.01) |
| *G06F 11/00* | (2006.01) |

(52) U.S. Cl.
CPC ........ *G06F 11/1464* (2013.01); *G06F 3/0614* (2013.01); *G06F 11/00* (2013.01); *G06F 11/1076* (2013.01); *G06F 2201/84* (2013.01)

(58) Field of Classification Search
CPC ............ G06F 11/1076; G06F 11/3409; G06F 3/0614; G06F 17/30283; G06F 11/2094; G06F 2211/1028; G06F 11/1004; G06F 17/30144; G06F 11/1464; G06F 3/0619; H04L 67/1097; H04L 63/0428; H04L 12/1881; H03M 13/373; H03M 13/1515; H03M 13/35; H03M 13/05
See application file for complete search history.

(56) References Cited

U.S. PATENT DOCUMENTS

| | | | |
|---|---|---|---|
| 7,181,578 B1 | 2/2007 | Guha | |
| 8,386,840 B2 | 2/2013 | Stougie | |
| 8,458,287 B2 | 6/2013 | Ozzie | |
| 8,473,778 B2 | 6/2013 | Simitci | |
| 8,677,203 B1 | 3/2014 | Shalvi | |
| 8,738,855 B2 | 5/2014 | De Spiegeleer | |
| 9,645,885 B2 | 5/2017 | De Schrijver | |
| 2002/0078244 A1 | 6/2002 | Howard | |
| 2007/0177739 A1 | 8/2007 | Ganguly | |
| 2013/0275815 A1* | 10/2013 | De Keyser | G06F 11/30 714/47.2 |

(Continued)

FOREIGN PATENT DOCUMENTS

| | | |
|---|---|---|
| EP | 2469411 A1 | 6/2012 |
| EP | 2469413 A1 | 6/2012 |

(Continued)

OTHER PUBLICATIONS

Dimakis, Alexandros G., and P. Brighten Godfrey et al. Network Coding for Distributed Storage Systems. Mar. 5, 2008, pp. 1-12, University of California, Berkeley.

*Primary Examiner* — Alexander Khong
(74) *Attorney, Agent, or Firm* — Patent Law Works LLP

(57) ABSTRACT

There is provided a distributed object storage system that includes several performance optimizations with respect to efficiently storing data objects when coping with a desired concurrent failure tolerance of concurrent failures of storage elements which is greater than two and with respect to optimizing encoding/decoding overhead and the number of input and output operations at the level of the storage elements.

21 Claims, 10 Drawing Sheets

(56) References Cited

U.S. PATENT DOCUMENTS

| | | |
|---|---|---|
| 2014/0129881 A1 | 5/2014 | De Schrijver |
| 2015/0039936 A1 | 2/2015 | Kazi |
| 2016/0011935 A1 | 1/2016 | Luby |
| 2016/0070740 A1 | 3/2016 | Vermeulen |
| 2016/0188218 A1* | 6/2016 | Gray .................. H04L 67/1097 711/165 |

FOREIGN PATENT DOCUMENTS

| | | |
|---|---|---|
| EP | 2659369 A1 | 11/2013 |
| EP | 2659372 A1 | 11/2013 |
| EP | 2672387 A1 | 12/2013 |
| EP | 2725491 A1 | 4/2014 |
| EP | 2793130 A1 | 10/2014 |
| WO | WO09135630 A2 | 11/2009 |

\* cited by examiner

HYBRID DISTRIBUTED STORAGE SYSTEM

FIELD OF THE INVENTION

The present disclosure generally relates to a distributed data storage system. Typically, such distributed storage systems are targeted at storing large amounts of data, such as objects or files in a distributed and fault tolerant manner with a predetermined level of redundancy.

BACKGROUND

Large scale storage systems are used to distribute stored data in the storage system over multiple storage elements, such as for example hard disks, or multiple components such as storage nodes comprising a plurality of such storage elements. However, as the number of storage elements in such a distributed object storage system increases, equally the probability of failure of one or more of these storage elements increases. In order to be able to cope with such failures of the storage elements of a large scale distributed storage system, it is required to introduce a certain level of redundancy into the distributed object storage system. This means that the distributed storage system must be able to cope with a failure of one or more storage elements without irrecoverable data loss. In its simplest form redundancy can be achieved by replication. This means storing multiple copies of data on multiple storage elements of the distributed storage system. In this way, when one of the storage elements storing a copy of the data object fails, this data object can still be recovered from another storage element holding another copy. Several schemes for replication are known in the art. However, in general replication is costly with regard to the storage capacity. This means that in order to survive two concurrent failures of a storage element of a distributed object storage system, at least two replica copies for each data object are required, which results in a storage capacity overhead of 200%, which means that for storing 1 GB of data objects a storage capacity of 3 GB is required. Another well-known scheme used for distributed storage systems is referred to as RAID systems of which some implementations are more efficient than replication with respect to storage capacity overhead. However, often RAID systems require a form of synchronisation of the different storage elements and require them to be of the same type. In the case of a failure of one of the storage elements, RAID systems often require immediate replacement, which needs to be followed by a costly and time consuming rebuild process in order to restore the failed storage element completely on the replacement storage element. Therefore known systems based on replication or known RAID systems are generally not configured to survive more than two concurrent storage element failures and/or require complex synchronisation between the storage elements and critical rebuild operations in case of a drive failure.

Therefore it has been proposed to use distributed object storage systems that are based on erasure encoding, such as for example described in WO2009135630, EP2469411, EP2469413, EP2793130, EP2659369, EP2659372, EP2672387, EP2725491, etc. Such a distributed object storage system stores the data object in fragments that are spread amongst the storage elements in such a way that for example a concurrent failure of six storage elements out of minimum of sixteen storage elements can be tolerated with a corresponding storage overhead of 60%, that means that 1 GB of data objects only require a storage capacity of 1.6 GB. It should be clear that in general distributed object storage systems based on erasure encoding referred to above differ considerably from for example parity based RAID 3, 4, 5 or RAID 6 like systems that can also make use of Reed-Solomon codes for dual check data computations. Such RAID like systems can at most tolerate one or two concurrent failures, and concern block-level, byte-level or bit-level striping of the data, and subsequent synchronisation between all storage elements storing such stripes of a data object or a file. The erasure encoding based distributed storage system described above generates for storage of a data object a large number of fragments, of which the number, for example hundreds or thousands, is far greater than the number of storage elements, for example ten or twenty, among which they need to be distributed. A share of this large number of fragments, for example 8000 fragments, that suffices for the recovery of the data object is distributed among a plurality of storage elements, for example ten storage elements, each of these storage elements comprising 800 of these fragments. Redundancy levels can now be flexible chosen to be greater than two, for example three, four, five, six, etc. by storing on three, four, five, six, etc. of these storage elements additionally 800 of these fragments. This can be done without a need for synchronisation between the storage elements and upon failure of a storage element there is no need for full recovery of this failed storage element to a replacement storage element. The number of fragments of a particular data object which it stored can simply be replaced by storing a corresponding number of fragments 800 to any other suitable storage element not yet storing any fragments of this data object. Fragments of different data objects of a failed storage element can be added to different other storage elements as long as they do not yet comprise fragments of the respective data object.

Additionally, in large scale distributed storage systems it is advantageous to make use of distributed object storage systems, which store data objects referenced by an object identifier, as opposed to file systems, such as for example US2002/0078244, which store files referenced by an mode or block based systems which store data in the form of data blocks referenced by a block address which have well known limitations in terms of scalability and flexibility. Distributed object storage systems in this way are able to surpass the maximum limits for storage capacity of file systems, etc. in a flexible way such that for example storage capacity can be added or removed in function of the needs, without degrading its performance as the system grows. This makes such object storage systems excellent candidates for large scale storage systems.

Current erasure encoding based distributed storage systems for large scale data storage are well equipped to efficiently store and retrieve data, however the high number of fragments spread amongst a higher number of storage elements leads to a relatively high number of input output operations at the level of the storage elements, which can become a bottleneck especially when for example a high number of relatively small data objects needs to be stored or retrieved. On the other hand, replication based systems cause a large storage overhead, especially when it is desired to implement a large scale distributed storage system which can tolerate a concurrent failure of more than two storage elements.

Therefore there still exists a need for an improved distributed object storage system that is able to overcome the abovementioned drawbacks and is able to provide for an efficient storage overhead when coping with a desired concurrent failure tolerance of storage elements which is greater than two and which optimizes the number of input and output operations at the level of the storage elements.

SUMMARY

According to one innovative aspect of the subject matter described in this disclosure, a distributed object storage system includes a plurality of storage elements adapted to redundantly store and retrieve a data object on a storage set, the storage set comprising two or more of the storage elements of the distributed storage system, such that a desired concurrent failure tolerance of concurrent failures of the storage elements of the storage set can be tolerated. The distributed object storage system further includes a plurality of storage nodes each comprising a share of the plurality of storage elements of the distributed storage system. The distributed object storage system also includes at least one controller node coupled to or at least partly comprised within the storage nodes.

A controller node includes a spreading module that is configured to select a level-1 fragment storage subset comprising a fragment spreading width of the storage elements of the storage set. The fragment spreading width is the sum of a basic level-1 fragment storage element count corresponding to the number of storage elements of the level-1 fragment storage subset which are not allowed to fail, and a redundant level-1 fragment storage element count corresponding to the number of storage elements of the level-1 fragment storage subset which are allowed to concurrently fail.

The spreading module is further configured to select a level-2 fragment storage subset comprising a level-2 fragment storage element count, which is equal to or greater than one, of the storage elements of the storage set, whereby the sum of the redundant level-1 fragment storage element count and the level-2 fragment storage element count is equal to or greater than the desired concurrent failure tolerance. The basic level-1 fragment storage element count exceeds the level-2 fragment storage element count, and the data object is decodable from the level-2 fragment storage subset.

The spreading module is yet further configured to store on each storage element of the level-1 fragment storage subset a level-1 fragment sub-collection comprising at least a level-1 encoding multiple of level-1 fragments generated by a hybrid encoding module, and store on each storage element of the level-2 fragment storage subset a level-2 fragment sub-collection comprising at least a level-2 encoding multiple of level-2 fragments generated by the hybrid encoding module.

The hybrid encoding module is configured to generate a level-1 fragment collection comprising at least the level-1 encoding multiple multiplied by the fragment spreading width of level-1 fragments of the data object, and a level-2 fragment collection comprising at least the level-2 encoding multiple multiplied by the level-2 fragment storage element count of level-2 fragments of the data object.

In general, another innovative aspect of the subject matter described in this disclosure may be embodied in a method of operating a distributed storage system that includes (1) selecting, by a spreading module, a level-1 fragment storage subset comprising a fragment spreading width of the storage elements of the storage set, the fragment spreading width being the sum of: (a) a basic level-1 fragment storage element count corresponding to the number of storage elements of the level-1 fragment storage subset which are not allowed to fail, and (b) a redundant level-1 fragment storage element count corresponding to the number of storage elements of the level-1 fragment storage subset which are allowed to concurrently fail; (2) selecting, by the spreading module, a level-2 fragment storage subset comprising a level-2 fragment storage count, which is equal to or greater than one, of the storage elements of the storage set, whereby the sum of the level-1 fragment storage element count and the level-2 fragment storage count is equal to or greater than the desired concurrent failure tolerance; (3) generating, by a hybrid encoding module, a level-1 fragment collection comprising at least a level-1 encoding multiple multiplied by the fragment spreading width of level-1 fragments of the data object, and a level-2 fragment collection comprising at least a level-2 encoding multiple multiplied by the level-2 fragment storage element count of level-2 fragments of the data object; (4) storing on each storage element of the level-1 fragment storage subset a level-1 fragment sub-collection comprising at least the level-1 encoding multiple of level-1 fragments generated by the hybrid encoding module; and (5) storing on each storage element of the level-2 fragment storage subset a level-2 fragment sub-collection comprising at least the level-2 encoding multiple of level-2 fragments generated by the hybrid encoding module.

Other embodiments of one or more of these aspects include corresponding systems, apparatus, and computer programs, configured to perform the action of the methods, encoded on computer storage devices.

These and other embodiments may each optionally include one or more features. For instance, the features include that the basic level-1 fragment storage element count exceeds the level-2 fragment storage element count and that the data object is decodable from the level-2 fragment storage subset.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
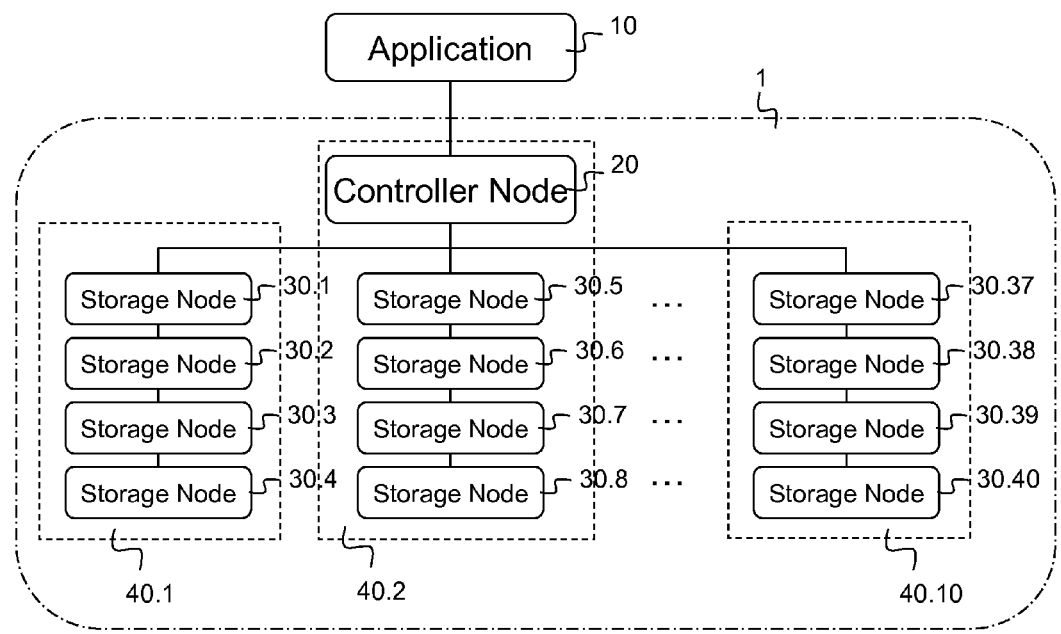
FIG. 1 illustrates an embodiment of a distributed storage system.

FIG. 1 shows an embodiment of a distributed storage system 1. According to this embodiment the distributed storage system 1 is implemented as a distributed object storage system 1 which is coupled to an application 10 for transferring data objects. The connection between the distributed storage system 1 and the application 10 could for example be implemented as a suitable data communication network. Such an application 10 could for example be a dedicated software application running on a computing device, such as a personal computer, a laptop, a wireless telephone, a personal digital assistant or any other type of communication device that is able to interface directly with the distributed storage system 1. However, according to alternative embodiments, the application 10 could for example comprise a suitable file system which enables a general purpose software application to interface with the distributed storage system 1, an Application Programming Interface (API) library for the distributed storage system 1, etc. As further shown in FIG. 1, the distributed storage system 1 comprises a controller node 20 and a plurality of storage nodes 30.1-30.40 which are all coupled in a suitable way for transferring data, for example by means of a conventional data communication network such as a local area network (LAN), a wide area network (WAN), a telephone network, such as the Public Switched Telephone Network (PSTN), an intranet, the internet, or any other suitable communication network or combination of communication networks. Controller nodes 20, storage nodes 30 and the device comprising application 10 may connect to the data communication network by means of suitable wired, wireless, optical, etc. network connections or any suitable combination of such network connections. Although the embodiment of FIG. 1 shows only a single controller node 20 and forty storage nodes 30, according to alternative embodiments the distributed storage system 1 could comprise any other suitable number of storage nodes 30 and for example two, three or more controller nodes 20 coupled to these storage nodes 30. These controller nodes 20 and storage nodes 30 can be built as general purpose computers, however more frequently they are physically adapted for arrangement in large data centres, where they are arranged in modular racks 40 comprising standard dimensions. Exemplary controller nodes 20 and storage nodes 30 are dimensioned to take up a single unit of such rack 40, which is generally referred to as 1 U. Such an exemplary storage node may use a low-power Intel processor, and may be equipped with ten or twelve 3 TB SATA disk drives and is connectable to the network over redundant 1 Gigabit Ethernet network interfaces. An exemplary controller node 20 may comprise high-performance, standard Intel Xeon based servers and provide network access to suitable applications 10 over multiple 10 Gigabit Ethernet network interfaces. Data can be transferred between suitable applications 10 and such a controller node 20 by means of a variety of network protocols including http/REST object interfaces, language-specific interfaces such as Microsoft .Net, Python or C, etc. Additionally such controller nodes comprise additional 10 Gigabit Ethernet ports to interface with the storage nodes 30. Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example storage nodes 30.1-30.4; 30.5-30.8; ...; and 30.7-30.40 each are respectively grouped into racks 40.1, 40.2, ... 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
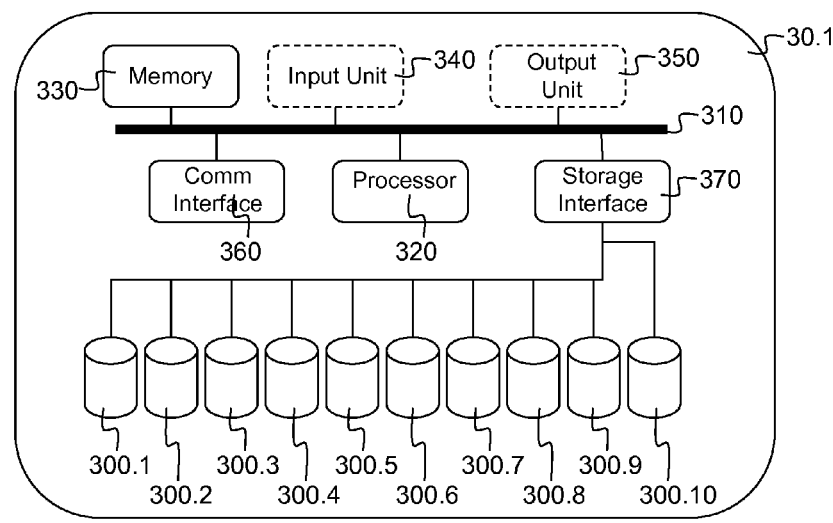
FIG. 2 schematically illustrates an embodiment of a storage node of the distributed storage system of FIG. 1, according to the techniques described herein.

FIG. 2 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370 and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for example 3 TB SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed object storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 2 the distributed storage system 1 comprises a plurality of storage elements 300. As will be described in further detail below, the storage elements 300, could also be referred to as redundant storage elements 300 as the data is stored on these storage elements 300 such that none of the individual storage elements 300 on its own is critical for the functioning of the distributed storage system. It is further clear that each of the storage nodes 30 comprises a share of these storage elements 300.

As shown in FIG. 1 storage node 30.1 comprises ten storage elements 300.1-300.10. Other storage nodes 30 could comprise a similar amount of storage elements 300, but this is however not essential. Storage node 30.2 could for example comprise six storage elements 300.11-300.16, and storage node 30.3 could for example comprise four storage elements 300.17-300.20. As will be explained in further detail below with respect to FIGS. 5 to 10, the distributed storage system 1 is for example operable as a distributed object storage system 1 to store and retrieve a data object 500 comprising data 520, for example 64 MB of binary data and a data object identifier 510 for addressing this data object 500, for example a universally unique identifier such as a globally unique identifier (GUID). It is clear that according to alternative embodiments still further alternative data object identifiers 510 could be used such as for example such as long as it allows unique identification of a data object 500 for a storage or retrieval operation. Such alternative data object identifiers 510 could for example be a suitable data object name as designated by a user of the object storage system 1 or the application 10, or a data object name automatically allocated by the object storage system 1 or the application 10, or any other suitable unique identifier. Embodiments of the distributed storage system 1, which operate as a distributed object storage system 1, storing the data offered for storage by the application 10 in the form of a data object, also referred to as object storage, have specific advantages over other storage schemes, such as conventional block based storage or conventional file based storage. These specific advantages such as scalability and flexibility, are of particular importance in a distributed object storage system 1 that is directed to large scale redundant storage applications, sometimes also referred to as cloud storage.

The storage elements 300 are redundant and operate independently of one another. This means that if one particular storage element 300 fails its function it can easily be taken on by another storage element 300 in the distributed storage system 1. However, as will be explained in more detail further below, there is no need for the storage elements 300 to work in synchronism, as is for example the case in many well-known RAID configurations, which sometimes even require disc spindle rotation to be synchronised. Furthermore, the independent and redundant operation of the storage elements 300 allows any suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, PATA and so on. This results in advantages relating to scalability and flexibility of the distributed storage system 1 as it allows for adding or removing storage elements 300 without imposing specific requirements to their design in correlation to other storage elements 300 already in use in the distributed object storage system 1.

Figure 3:
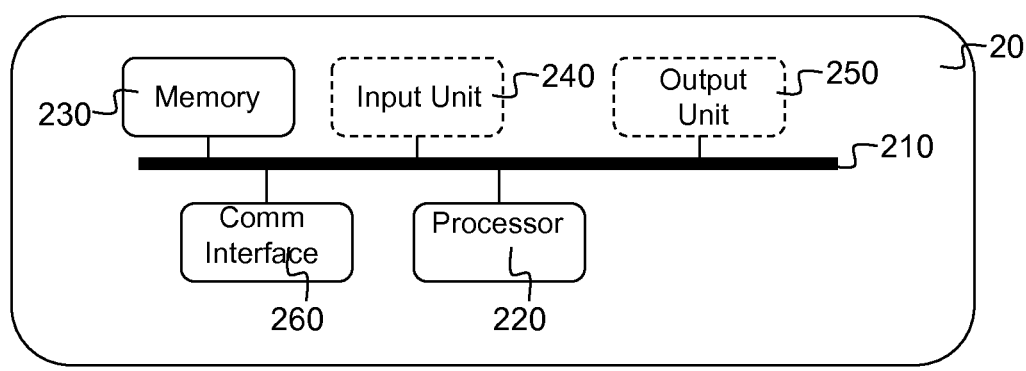
FIG. 3 schematically illustrates an embodiment of a controller node of the distributed storage system of FIG. 1, according to the techniques described herein.

FIG. 3 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still further embodiments the components of the controller node 20 as described in more detail below could be distributed amongst a plurality of controller nodes 20 and/or storage nodes 30 in any suitable way. According to still a further embodiment the device on which the application 10 runs is a controller node 30.

Figure 4:
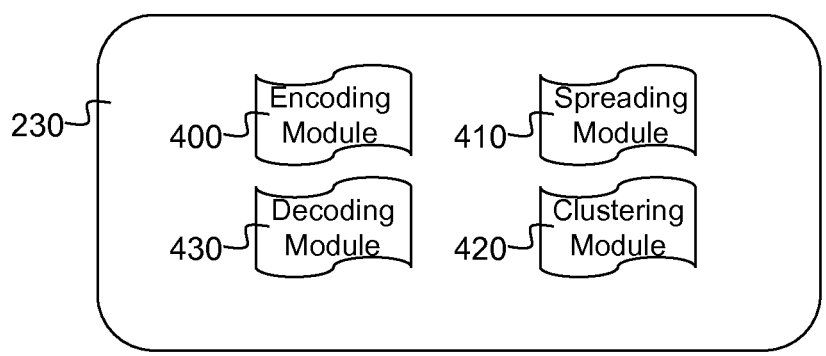
FIG. 4 schematically illustrates some elements of the controller node of FIG. 3 in more detail, according to the techniques described herein.

As schematically shown in FIG. 4, an embodiment of the controller node 20 comprises four modules: a hybrid encoding module 400; a spreading module 410; a clustering module 420; and a decoding module 430. These modules 400, 410, 420, 430 can for example be implemented as programming instructions stored in local memory 230 of the controller node 20 for execution by its processor 220.

The functioning of particular embodiments of these modules 400, 410, 420, 430 will now be explained by means of FIGS. 5 to 10. The distributed storage system 1 stores a data object 500 as provided by the application 10 in function of a reliability policy which guarantees a level of redundancy. That means that the distributed object storage system 1 must for example guarantee that it will be able to correctly retrieve data object 500 even if a number of storage elements 300 would be unavailable, for example because they are damaged or inaccessible. Such a reliability policy could for example require the distributed storage system 1 to be able to retrieve the data object 500 in case of seven concurrent failures of the storage elements 300 it comprises. In large scale data storage massive amounts of data are stored on storage elements 300 that are individually unreliable, as such, redundancy must be introduced into the storage system to improve reliability. However the most commonly used form of redundancy, straightforward replication of the data on multiple storage elements 300, similar as for example RAID 1, is only able to achieve acceptable levels of reliability at the cost of unacceptable levels of overhead. For example, in order to achieve sufficient redundancy to cope with seven concurrent failures of storage elements 300, each data object 500 would need to be replicated until eight replication copies are stored on eight storage elements, such that when seven of these storage elements fail concurrently, there still remains one storage element available comprising a replication copy. As such, storing 1 GB of data objects in this way would result in the need of 8 GB of storage capacity in a distributed storage system, which means an increase in the storage cost by a factor of eight or a storage cost of 800%, or a storage overhead of 700%. Other standard RAID levels are only able to cope with a single drive failure, for example RAID 2, RAID 3, RAID 4, RAID 5; or two concurrent drive failures, such as for example RAID 6. It would be possible to reach higher redundancy levels with for example nested RAID levels, such as for example RAID 5+0. This could provide for a concurrent failure tolerance of seven storage elements when providing seven RAID 0 sets, each of these RAID 0 sets comprising a three disk RAID 5 configuration. However, it should be clear that in such nested RAID configurations, such as for example RAID 5+0 or RAID 6+0, high levels of synchronisation of the storage elements are preferred, and that the rebuild process in case of a drive failure is critical, often leading to the necessity to provide hot spares, which further reduce the storage efficiency of such configurations. Additionally, in such nested RAID configurations, each increase in the level of redundancy leads to the need for providing an additional synchronised set comprising the minimum number storage elements needed for the lowest level RAID configuration and associated control systems. Therefore, it should be clear that, as will be described in more detail below, the distributed storage system 1, which makes use of erasure coding techniques achieves the requirements of a reliability policy with higher redundancy levels than can be achieved with standard RAID levels, with considerably less storage overhead. As will be explained in further detail below when using erasure encoding with a rate of encoding r=10/16 six concurrent failures of storage element 300 can be tolerated on 16 storage elements 300, which requires a storage overhead of 60% or a storage cost of a factor of 1.6 or a storage cost of 160%. This means that storing 1 GB of data objects in this way will result in the need for 1.6 GB of storage capacity in a level-1 fragment storage subset 34 of the distributed storage system 1. Some known erasure encoding techniques make use of Reed-Solomon codes, but also fountain codes or rateless erasure codes such as online codes, LDPC codes, raptor codes and numerous other coding schemes are available. However as will be explained in further detail below, a storage and/or retrieval operation of a single data object then results in the need for accessing at least ten of the storage elements and thus a corresponding increase in the number of input/output operations per storage element of the distributed storage system. Especially in the case of frequently accessed data objects and/or in the case of a high number of storage and/or retrieval operations the maximum number of input/output operations of the storage elements could become a bottle neck for the performance of the distributed object storage system.

Figure 5:
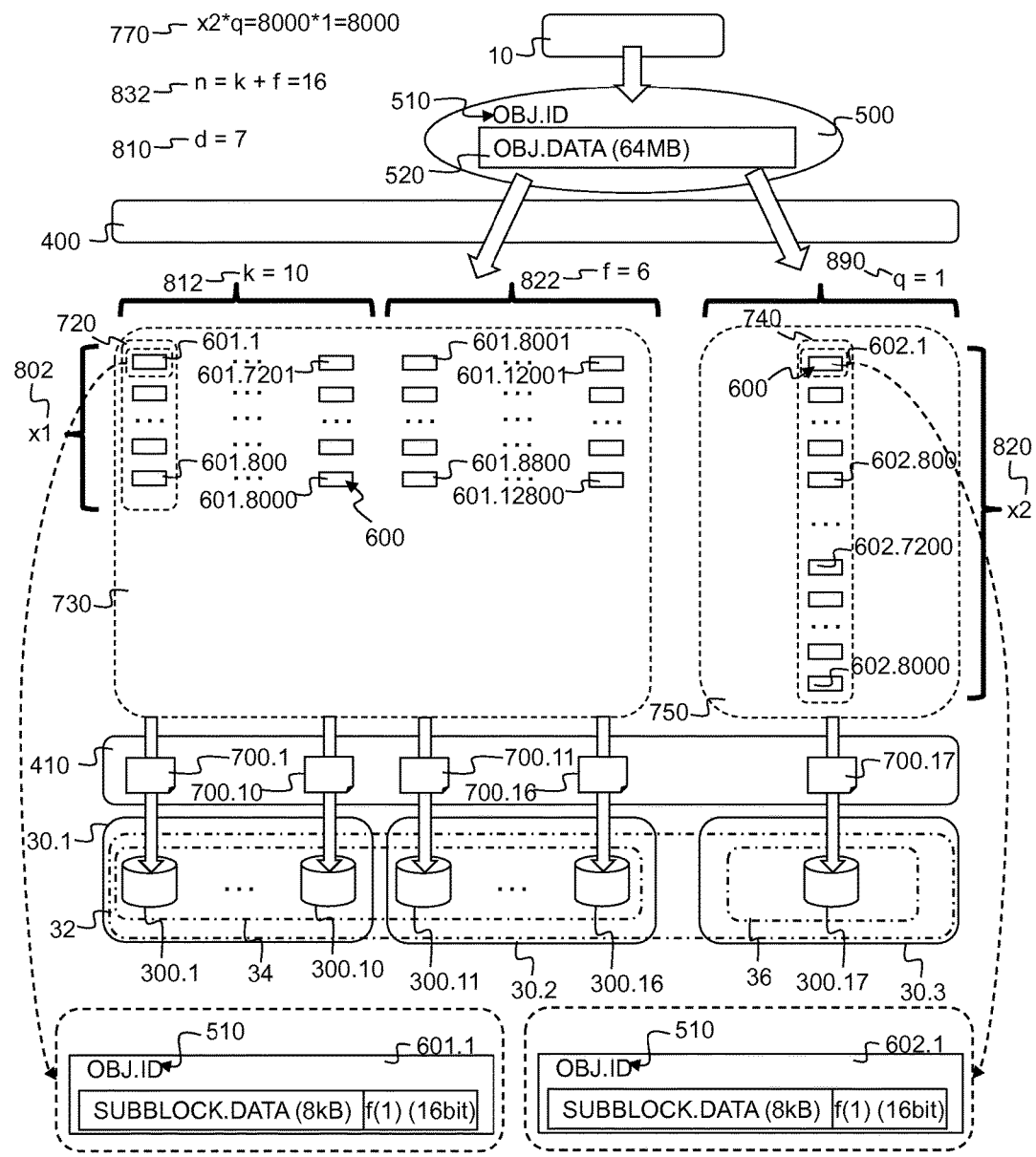
FIG. 5 schematically illustrates a storage operation according to the hybrid storage and retrieval option, according to the techniques described herein.

FIG. 5 shows a storage operation according to a hybrid storage and retrieval option performed by an embodiment of the distributed storage system 1 that is able to tolerate seven concurrent failures of a storage element 300. This means that the distributed storage system 1 comprises a plurality of storage elements 300, for example hundred or more, adapted to redundantly store and retrieve a data object 500 on a storage set 32 comprising a set of these storage elements 300, for example eight, nine, ten or more, such that a desired concurrent failure tolerance 810 of seven concurrent failures of these storage elements 300 of this storage set 32 can be tolerated. As will be explained in further detail below, the storage set 32 comprises for example seventeen storage elements 300, for example storage elements 300.1-300.17 as shown in FIG. 5, of which a concurrent failure of any seven of these seventeen storage elements 300 can be tolerated without loss of data. This means that the distributed storage system 1 is operated such that a desired concurrent failure tolerance 810, which is equal to seven or d=7, of concurrent failures of the storage elements 300 of the storage set 32 can be tolerated. As shown, according to this embodiment, the data object 500 is provided to the distributed storage system 1 by the application 10 which requests a storage operation for this data object 500. As further shown, according to this embodiment, the data object 500 comprises an object identifier 510, such as for example a GUID, and object data 520, for example 64 MB of binary data.

According to this embodiment, the storage set 32 comprises seventeen storage elements 300 for storing the data object 500 in the following way. It is clear that the distributed storage system 1 could comprise much more than seventeen storage elements 300, for example more than a hundred or more than thousand storage elements 300. According to the embodiment shown in FIG. 5, as shown, the spreading module 410 selects a level-1 fragment storage subset 34 comprising a fragment spreading width 832 of storage elements of the storage set 32, which in this embodiment corresponds to storage element 300.1-300.16. Further, the spreading module 410 selects a level-2 fragment storage subset 36 comprising a level-2 fragment storage element count 890 of storage elements of the storage set 32, which is in this embodiment one storage element 300.17. Storage set 32 in this way comprises the level-1 fragment storage subset 34 of storage elements 300.1-300.16 and the level-2 fragment storage subset 36 with storage element 300.17. In this embodiment, these storage subsets 34, 36 of the storage set 32 are complementary to each other, i.e. they do not overlap. In an alternative embodiment, the level-1 fragment storage subset 34 and the level-2 fragment storage subset 36 could at least partly overlap. This means that at least one storage element 300 will be part of both the level-1 fragment storage subset 34 and the level-2 fragment storage subset 36, as explained in further detail below.

According to an embodiment, the spreading module 410 selects a level-1 fragment storage subset 34 comprising a fragment spreading width 832 of the storage elements 300 of the storage set 32. As shown, according to this embodiment, the fragment spreading width 832 equals n=16. This fragment spreading width 832 is the sum of a basic level-1 fragment storage element count 812 corresponding to the number of storage elements 300 of the level-1 fragment storage subset 34 which are not allowed to fail and a redundant level-1 fragment storage element count 822 corresponding to the number of storage elements 300 of the level-1 fragment storage subset 34 which are allowed to concurrently fail. Hence, according to this embodiment the redundant level-1 fragment storage element count 822 (i.e. f=6) is equal to the desired concurrent failure tolerance 810, i.e. d=7, minus the level-2 fragment storage element count 890, i.e. q=1.

During a storage operation, the hybrid encoding module 400 will disassemble the data object 500 into an encoding number x1*n=16*800=12800 of redundant level-1 fragments 601, which also comprise the data object identifier 510. This encoding number x1*n=16*800=12800 corresponds to a level-1 encoding multiple x1=800 of a fragment spreading width n=16. This fragment spreading width n=16=k+f=10+6 consists of the sum of a basic level-1 fragment storage element count k=10 and a redundant level-1 fragment storage element count f=6. This redundant level-1 fragment storage element count f=6 corresponds to the number of storage elements 300 of the level-1 fragment storage set 34 that store level-1 fragments 601 of the data object 500 and are allowed to fail concurrently for the level-1 fragment storage subset 34. The basic level-1 fragment storage element count k=10, corresponds to the number of storage elements 300 that must store level-1 fragments 601 of the data object 500 and are not allowed to fail.

The hybrid encoding module 400 for example makes use of an erasure encoding scheme to produce these encoding number x1*n=16*800=12800 of redundant level-1 fragments 601.1-601.12800. Reference is made to known erasure encoding schemes, such as in WO2009135630, which hereby is incorporated by reference.

In this way, each one of these redundant level-1 fragments 601, such as for example fragment 601.1 comprises encoded data of equal size of the data object 500 divided by a factor equal to the level-1 encoding multiple of the basic level-1 fragment storage element count x1*k=800*10=8000. This means that the size of level-1 fragment 601.1 in the example above with a data object of 64 MB will be 8 kB, as this corresponds to 64 MB divided by x1*k=800*10=8000. Level-1 fragment 601.1 will further comprise decoding data f(1), such that the data object 500 can be decoded from any combination of a basic fragment count 770 of the redundant level-1 fragments 601 corresponding to the number x1*k=800*10=8000, with the level-1 encoding multiple x1=800 and the basic level-1 fragment storage element count k=10. To accomplish this, the hybrid encoding module 400 will preferably make use of an erasure encoding scheme with a rate of encoding r=k/n=10/16 which corresponds to the basic level-1 fragment storage element count k=10 divided by the fragment spreading width n=16. In practice this means that the hybrid encoding module 400 will first split the data object 500 of 64 MB into x1*k=800*10=8000 chunks of 8 kB, subsequently using an erasure encoding scheme with a rate of encoding of r=k/n=10/16, it will generate x1*n=800*16=12800 encoded redundant level-1 fragments 601.1-601.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the level-1 fragment 601, such as for example a suitable fragment identifier. Because of the erasure encoding scheme used, namely a rate of encoding r=k/n=10/16, the level-1 fragments 601.1-601.12800 allow the data object 500 to be decoded from any combination of the basic fragment count 770 of level-1 fragments 601 which corresponds to the level-1 encoding multiple of the basic level-1 fragment storage element count x1*k=800*10=8000, such as for example the combination of level-1 fragments 601.1-601.4000 and level-1 fragments 601.8001-601.12000.

According to an embodiment, for example, before generating the level-1 fragments 601, the hybrid encoding module 400 first generates at least a basic fragment count 770 of level-2 fragments 602 by disassembling the data object 500 into the basic fragment count 770 of level-2 fragments of the data object 500. In this embodiment the hybrid encoding module 400 makes use of the same erasure encoding scheme to produce redundant level-2 fragments 602 as explained above for the generation of level-1 fragments. Therefore, the hybrid encoding module 400 will generate a basic fragment count 770 of b=x1*k=800*10=8000 level-2 fragments, i.e. level-2 fragments 602.1-602.8000.

In this way, analogous to the level-1 encoding, each one of these redundant level-2 fragments 602, such as for example fragment 602.1 comprises encoded data of equal size of the data object 500 divided by the factor equal to the level-1 encoding multiple of the basic level-1 fragment storage element count x1*k=800*10=8000. Level-2 fragment 602.1 will further comprise decoding data f(1). As the same erasure encoding scheme is used, the data object 500 can be decoded from any combination of the redundant level-1 fragments 601 and/or level-2 fragments 602 of which the number corresponds to the basic fragment count b=8000, such as for example the combination of level-2 fragments 602.1-602.8000.

The hybrid encoding module 400 will generate b=8000 redundant level-2 fragments. The spreading module 410 first stores the basic fragment count 770 of level-2 fragments 602 on the one or more storage elements 300 of the level-2 fragment storage subset 36 as soon as it is generated by the hybrid encoding module 400, before generating a level-1 fragment collection 730 as discussed earlier. However, it is clear that alternative embodiments are possible in which level-1 fragments and level-2 fragments are concurrently generated and spread.

During a storage operation, the data object 500 is offered to the hybrid encoding module 400 of the controller node 20. The hybrid encoding module 400 generates a level-2 fragment collection 750 of redundant level-2 fragments of the data object 500, comprising a data object identifier 510 and a fragment of the object data 520. Subsequently, as shown in FIG. 5, the spreading module 410 will store on storage element 300.17 of the level-2 fragment storage subset 36, the level-2 fragment collection 750 of a level-2 encoding multiple x2 of level-2 fragments 602 generated by the hybrid encoding module 400. In this embodiment, the level-2 encoding multiple x2=b/q=8000/1 is equal to the basic fragment count 770 of b=8000, divided by the level-2 fragment storage element count 890 of q=1.

According to an embodiment, the storage elements 300 of the level-2 fragment storage subset 36 comprise a suitable file system, block device, or any other suitable storage structure to manage storage and retrieval of the fragments, in which the level-2 fragment collection 750 of level-2 fragments 602 of the object data 520 is stored by the spreading module 410 in the form of a fragment file 700.17, or any other suitable structure for storage and retrieval of the fragments that matches the respective storage structure in use on the storage elements 300. Preferably the spreading module 410 stores a level-2 fragment sub-collection 740 on a single storage element 300.17 into the fragment file 700.17 that is subsequently stored in the file system that is in use on the respective storage element 300.17. As shown in FIG. 5 storage element 300.17 is for example arranged in storage node 30.3.

It is clear that according to this embodiment of the distributed object storage system, 1 GB of data objects 500 being processed by the hybrid encoding module will result in a need for a storage capacity of 1.6 GB+1 GB=2.6 GB, as the storage of the level-1 fragments on the level-1 fragment storage subset 34, the storage cost of such an erasure coding scheme is inversely proportional to the rate of encoding and in this particular embodiment will be a factor of 1/r=1/(10/16)=1.6, results in 1.6 GB of data. It is clear that this means that 1 GB of data is stored on the basic level-1 fragment storage element count k=10 of storage elements 300.1-300.10 of the level-1 fragment storage subset, and 0.6 GB of data is stored on the redundant level-1 fragment storage element count f=6 of storage elements 300.10-300.16 of the level-1 fragment storage subset. Similar as for the basic fragment count b=8000 of level-1 fragments, also for the basic fragment count b=8000 of level-2 fragments of the data object 500 on storage element 300.17, the corresponding storage of the level-2 fragment storage subset 36 results in 1 GB or 100% of data. For a data object 500 of 64 MB, this results in a need for storage capacity of 64 MB*1.6+64 MB*1=166 MB. This corresponds to a storage cost of a factor of 1.6 or 160%. This storage capacity and storage cost will also hold in the alternative embodiment, wherein level-2 fragments are generated according to another encoding scheme.

Subsequently, as shown in FIG. 5, the spreading module 410 will store the encoding number x1*n=800*16=12800 of encoded redundant level-1 fragments 601.1-601.12800 on a number of storage elements 300 which corresponds to the fragment spreading width n=16, such as for example storage elements 300.1-300.16. The spreading module 410 will store on each of these storage elements 300.1-300.16 the level-1 encoding multiple x1=800 of these level-1 fragments 601. As shown in FIG. 5 level-1 fragments 601.1-601.800 are stored on storage element 300.1, the next x1=800 of these level-1 fragments are stored on storage element 300.2 and so on until the last x1=800 of these level-1 fragments 601.12001-601.12800 are stored on storage element 300.16. According to an embodiment, the storage elements 300 comprise a suitable file system, block device, or any other suitable storage structure to manage storage and retrieval of the fragments, in which the level-1 fragments 601 are stored by the spreading module 410 in the form of fragment files 700, or any other suitable structure for storage and retrieval of the fragments that matches the respective storage structure in use on the storage elements 300. Preferably the spreading module 410 groups all level-1 fragments 601 that need to be stored on a single storage element 300 into a single fragment file 700 that is subsequently stored in the file system that is in use on the respective storage element 300. For the embodiment shown in FIG. 5 this would mean that the level-1 fragments 601.1-601.800 which need to be stored on the storage element 300.1 would be grouped in a single fragment file 700.1 by the spreading module 410. This fragment file 700.1 then being stored in the file system of storage element 300.1. As shown in FIG. 5 storage elements 300.1-300.10 are arranged in storage node 30.1 and storage elements 300.11-300.16 are arranged in storage node 30.2.

Although alternative methods for determining the share of fragments to be stored on specific storage elements 300 are well known to the person skilled in the art and are for example described in WO2009135630 it is generally preferable to configure the spreading module 410 to store an equal share of the total amount of fragments 601 on each of the storage elements 300 selected for storage. This allows for a simple configuration of the spreading module 410 which then for example generates a fragment file 700 for storage on each of the storage elements 300 selected that will comprise an equal share of the total amount of level-1 fragments 601 and will thus also be equal in size. In the example as shown in FIG. 5 this would result in 16 fragment files 700.1-700.16 each comprising 800 fragments 601 and each of these fragment files 700 would have a size 6400 kB as it comprises 800 times 8 kB of fragment data 520.

It is clear that according to alternative embodiments other values could have been chosen for the parameters x1, f, k, n=k+f and r=k/n mentioned in embodiment above, such as for example x1=400, f=4, k=12; n=k+f=12+4=16 and r=12/16; or any other possible combination that conforms to a desired reliability policy for redundancy and concurrent failure tolerance of storage elements 300 of the level-1 fragment storage subset 34 of the distributed object storage system 1.

According to still a further alternative there could be provided a safety margin to the level-1 encoding multiple 802 for generating level-1 fragments 601 and/or to the level-2 encoding multiple 820 for generating level-2 fragments 602, by the hybrid encoding module 400. In such an embodiment some of the storage efficiency is traded in for some additional redundancy over the theoretical minimum. This preventively increases the tolerance for failures and the time window that is available for a repair activity. However according to a preferred embodiment this safety margin will be rather limited such that it only accounts for an increase in fragments that must be generated and stored of for example approximately 10% to 30%, such as for example 20%.

Figure 6:
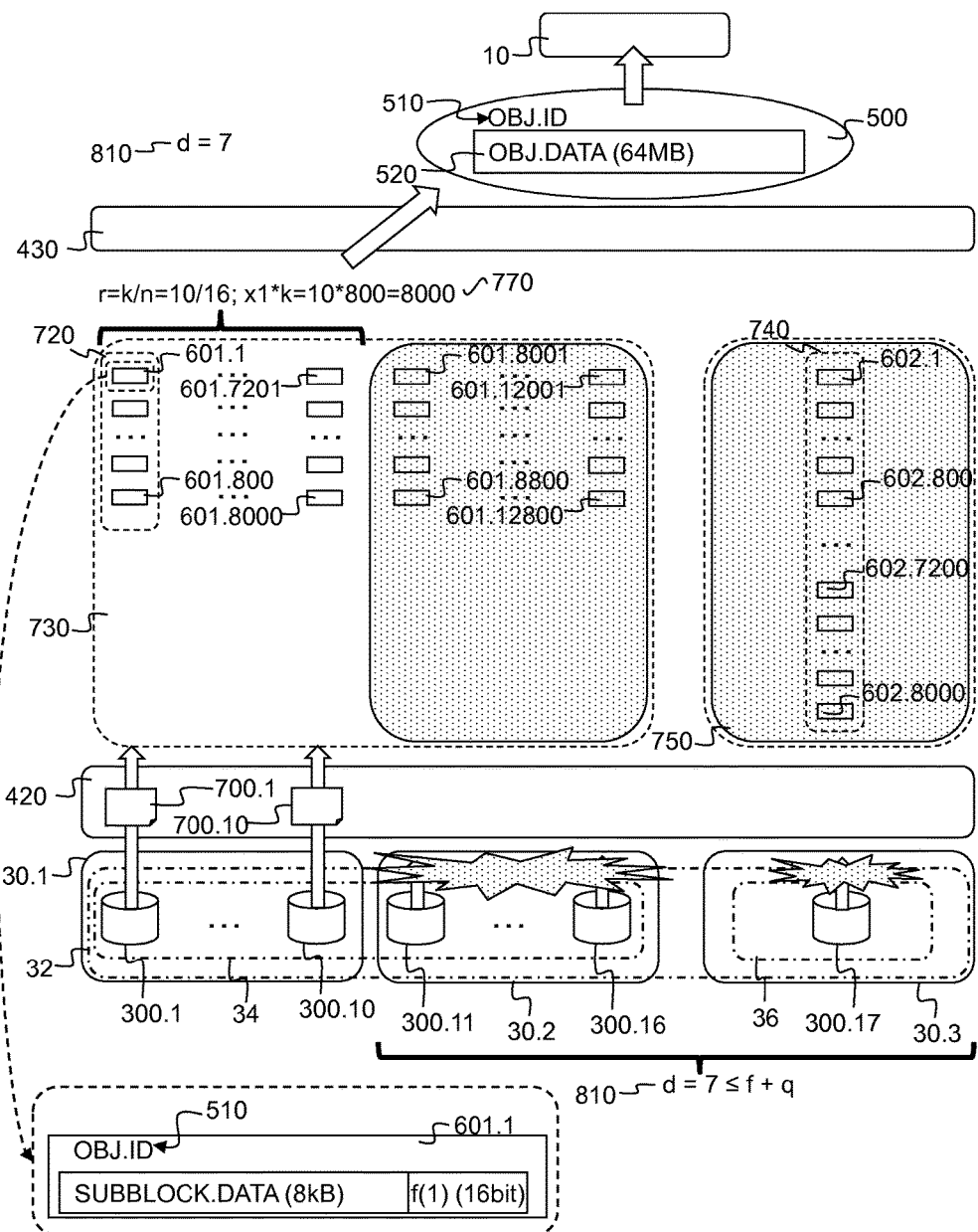
FIG. 6 schematically illustrates a retrieval operation according to the hybrid storage and retrieval option, according to the techniques described herein.

FIG. 6 shows the corresponding retrieval operation according to this hybrid storage and retrieval option performed by the embodiment of the distributed object storage system 1 as described for the storage operation of FIG. 5 that is able to tolerate seven concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 420 of the controller node 20 will initiate the retrieval of a basic fragment count of level-1 fragments and/or level-2 fragments of the data object 500 associated with the corresponding data object identifier 510 stored by the spreading module 410 on the level-2 fragment storage subset 36. In this embodiment, the clustering module 420 will try to retrieve the fragment file 700.17 that was stored on storage element 300.17 of the level-2 fragment storage subset 36.

In case this fragment file 700.17 or other fragment files 700 with level-2 fragments corresponding to the data object 500 with corresponding data object identifier 510, are not retrievable, e.g. when there is a problem in network connectivity between the controller node 20 and storage node 30.3 as indicated in FIG. 6, the clustering module 420 of the controller node 20 will initiate the retrieval of the level-1 fragments 601 associated with this data object identifier 510. It will try to retrieve the encoding number x1*n=16*800=12800 of redundant level-1 fragments 601.1-601.12800 from the fragment files 700.1-700.16 that were stored on the storage elements 300.1-300.16. Because of the encoding technology used and the corresponding decoding techniques available, it is sufficient for the clustering module 420, to retrieve the basic fragment count of redundant level-1 fragments 601 from these storage elements 300.1-300.16. This could be the case when for example there is a problem in network connectivity between the controller node 20 and storage node 30.2 as indicated in FIG. 6. In that case the retrieval operation of the clustering module will be able to retrieve the level-1 fragments 601.1-601.8000 which corresponds to the level-1 encoding multiple of the basic level-1 fragment storage element count x1*k=800*10=8000. The retrieved blocks 601.1-601.8000 allow the decoding module 430 to assemble data object 500 and offer it to the application 10. It is clear that any number in any combination of the redundant level-1 fragments 601 and/or level-2 fragments 602 corresponding to the data object 500, as long as their number is equal to or greater than the basic fragment count 770 b=x1*k=800*10=8000, would have enabled the decoding module 430 to assemble the data object 500.

It is clear that according to further embodiments, other values can be chosen for parameters x2 and q as mentioned above. FIGS. 7-10 illustrate alternative storage operations according the hybrid storage and retrieval option for the storage set 32 comprising seventeen storage elements 300, i.e. 300.1-300.17, and of which a concurrent failure d of any seven of these seventeen storage elements 300 can be tolerated without loss of data.

Figure 7:
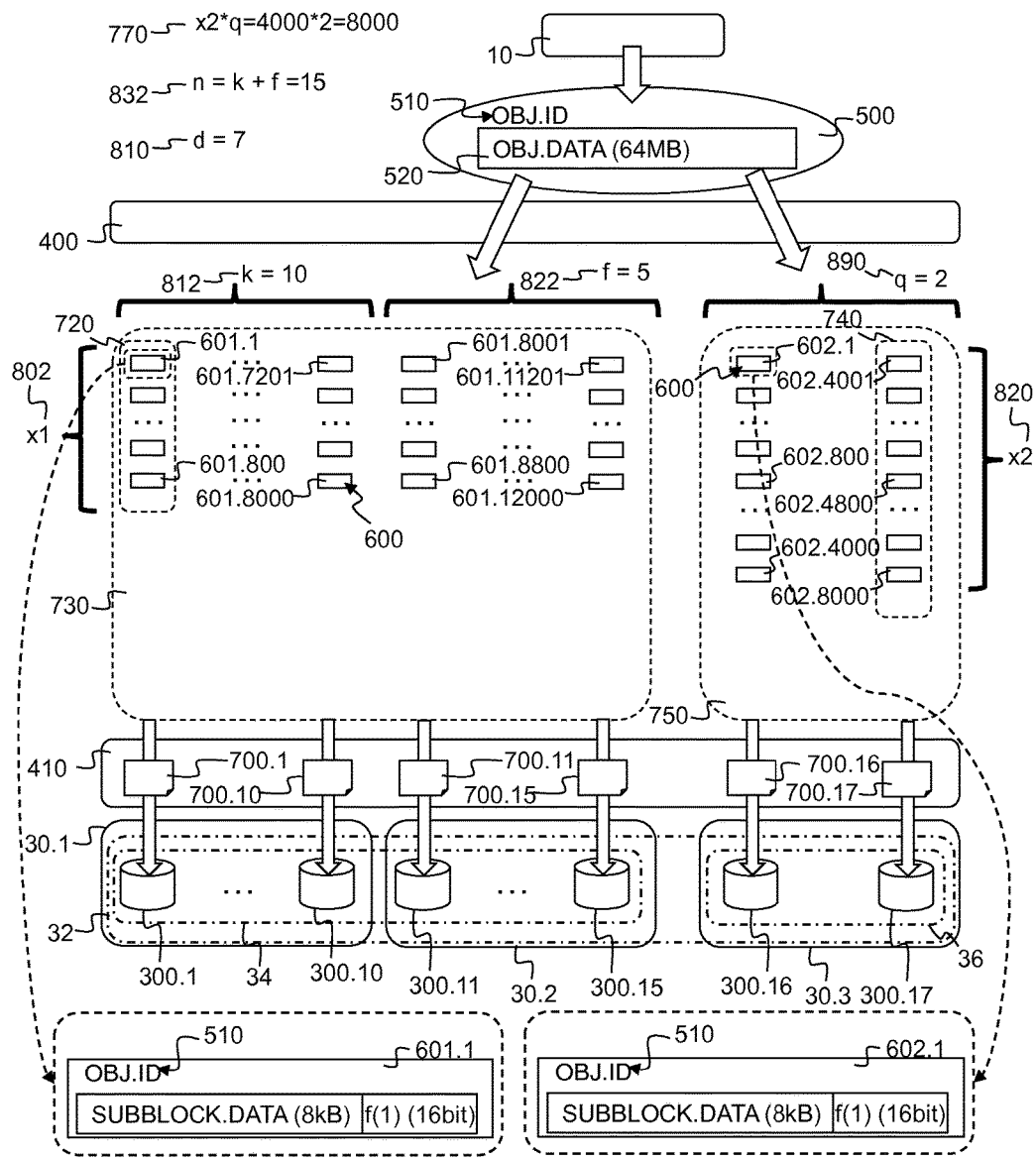
FIGS. 7 to 10 schematically illustrate alternative storage operations according to the hybrid storage and retrieval option, according to the techniques described herein.

According to the embodiment shown in FIG. 7, storage set 32 comprises the level-1 fragment storage subset 34 of storage elements 300.1-300.15 and the complementary level-2 fragment storage subset 36 with storage elements 300.16 and 300.17. The basic fragment count 770 again corresponds to $x1*k=800*10=8000$. The fragment spreading width n=15 consists of the sum of a basic level-1 fragment storage element count k=10 and a redundant level-1 fragment storage element count f=5. The hybrid encoding module 400 will disassemble the data object 500 into an encoding number $x1*n=8000*15=12000$ of redundant level-1 fragments 601, i.e. fragments 601.1-601.12000. In this embodiment, the hybrid encoding module 400 generates a level-2 encoding multiple equal to the basic fragment count divided by the level-2 fragment storage element count, i.e. $x2=b/q=8000/2=4000$ of level-2 fragments for each storage element of the level-2 fragment storage subset 36, i.e. for storage elements 300.16 and 300.17. Level-2 fragments 602.1-602.4000 are generated and stored on storage element 300.16 and level-2 fragments 602.4001-602.8000 are generated and stored on storage element 300.17. In this embodiment, the decoding module is adapted to generate the data object 500 from any combination of at least the basic fragment count (i.e. 8000) of level-1 fragments or from at least the basic fragment count (i.e. 8000) of level-2 fragments retrieved by the clustering module. It is clear that according to this embodiment of the distributed object storage system, 1 GB of data objects 500 being processed by the hybrid encoding module will result in a need for a storage capacity of 1.5 GB+1 GB=2.5 GB. For a data object 500 of 64 MB, this results in a need for storage capacity of 64 MB*1.5+64 MB*1=160 MB. This corresponds to a storage overhead of 150% or a storage cost of 250%.

Figure 8:
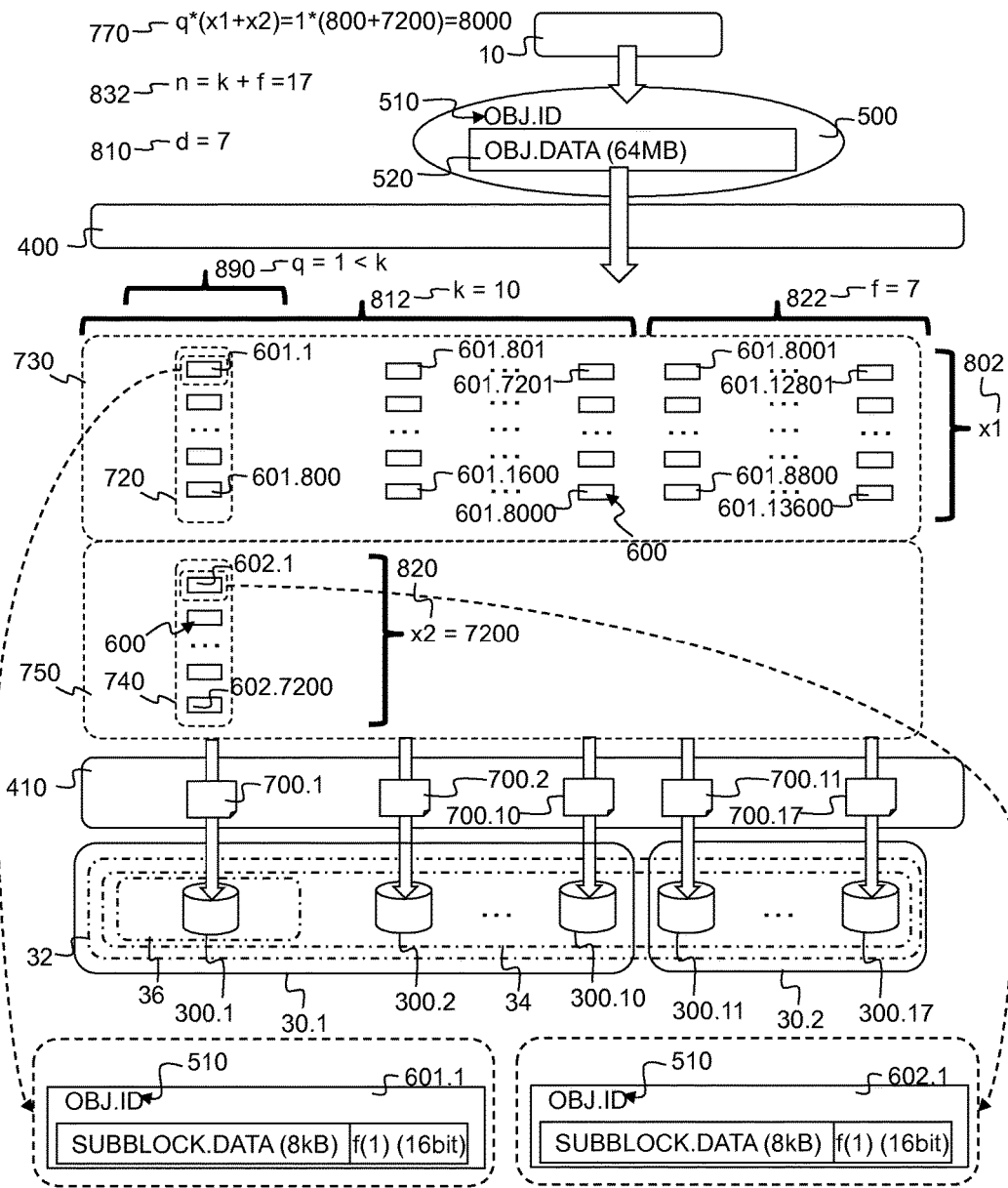

According to the embodiment shown in FIG. 8, storage set 32 comprises the level-1 fragment storage subset 34 of storage elements 300.1-300.17. The basic fragment count 770 again corresponds to $x1*k=800*10=8000$. The level-1 fragment storage subset 34 comprises the level-2 fragment storage subset 36 with common storage element 300.1. The hybrid encoding module 400 will disassemble the data object 500 into an encoding number $x1*n=800*17=13600$ of redundant level-1 fragments 601, i.e. fragments 601.1-601.13600. The fragment spreading width n=17 consists of the sum of a basic level-1 fragment storage element count k=10 and a redundant level-1 fragment storage element count f=7. In this embodiment, the hybrid encoding module 400 generates a level-2 encoding multiple equal to the basic fragment count divided by the level-2 fragment storage element count minus the level-1 encoding multiple, i.e. $x2=b/q - x1=8000/1-800=7200$ of level-2 fragments for the storage element of the level-2 fragment storage subset 36, i.e. storage element 300.1. Level-2 fragments 602.1-602.7200 are generated and stored on storage element 300.1. In this embodiment, the decoding module is adapted to generate the data object from any combination of level-1 fragments and/or level-2 fragments, of which the number is at least the basic fragment count 770 $b=x1*k=8000$. It is clear that according to this embodiment of the distributed object storage system, 1 GB of data objects 500 being processed by the hybrid encoding module will result in a need for a storage capacity of 1.7 GB+0.9 GB=2.6 GB. For a data object 500 of 64 MB, this results in a need for storage capacity of 64 MB*1.7+64 MB*0.9=166 MB. This corresponds to a storage overhead of 160% or a storage cost of 260%.

Figure 9:
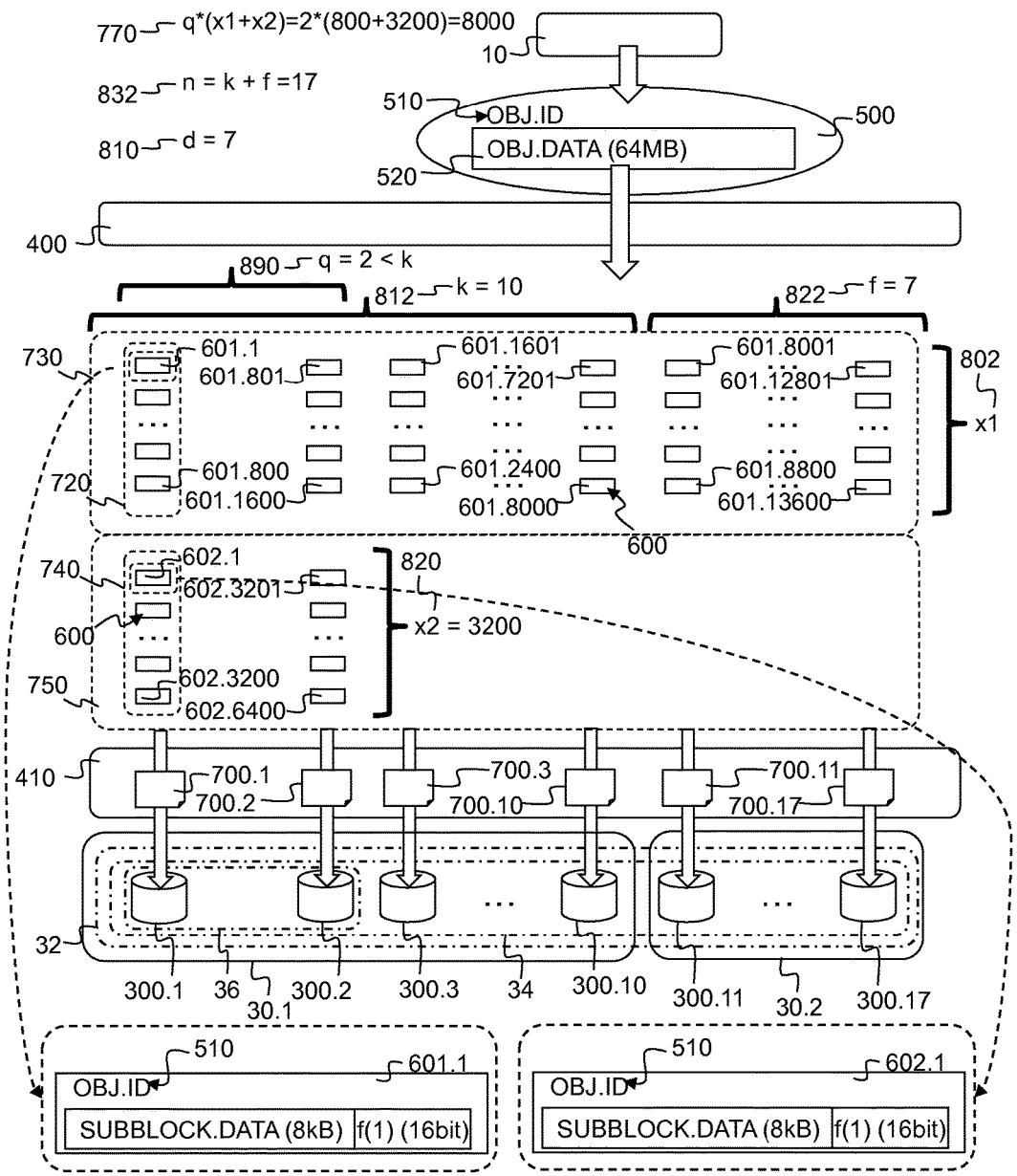

According to the embodiment shown in FIG. 9, storage set 32 comprises the level-1 fragment storage subset 34 of storage elements 300.1-300.17. The basic fragment count 770 again corresponds to $x1*k=800*10=8000$. The level-1 fragment storage subset 34 comprises the level-2 fragment storage subset 36 with two common storage elements 300.1 and 300.2. The hybrid encoding module 400 will disassemble the data object 500 into an encoding number $x1*_n=800*17=13600$ of redundant level-1 fragments 601, i.e. fragments 601.1-601.13600. The fragment spreading width n=17 consists of the sum of a basic level-1 fragment storage element count k=10 and a redundant level-1 fragment storage element count f=7. In this embodiment, the hybrid encoding module 400 generates a level-2 encoding multiple equal to the basic fragment count divided by the level-2 fragment storage element count minus the level-1 encoding multiple, i.e. $x2=b/q-x1=8000/2-800=3200$ of level-2 fragments for each storage element of the level-2 fragment storage subset 36, i.e. for storage elements 300.1 and 300.2. Level-2 fragments 602.1-602.3200 are generated and stored on storage element 300.1. Level-2 fragments 602.3201-602.6400 are generated and stored on storage element 300.2. In this embodiment, the decoding module is adapted to generate the data object from any combination of level-1 fragments and/or level-2 fragments, of which the number is at least the basic fragment count 770 $b=x1*k=8000$. It is clear that according to this embodiment of the distributed object storage system, 1 GB of data objects 500 being processed by the hybrid encoding module will result in a need for a storage capacity of 1.7 GB+0.8 GB=2.5 GB. For a data object 500 of 64 MB, this results in a need for storage capacity of 64 MB*1.7+64 MB*0.8=160 MB. This corresponds to a storage overhead of 150% or a storage cost of 250%.

Figure 10:
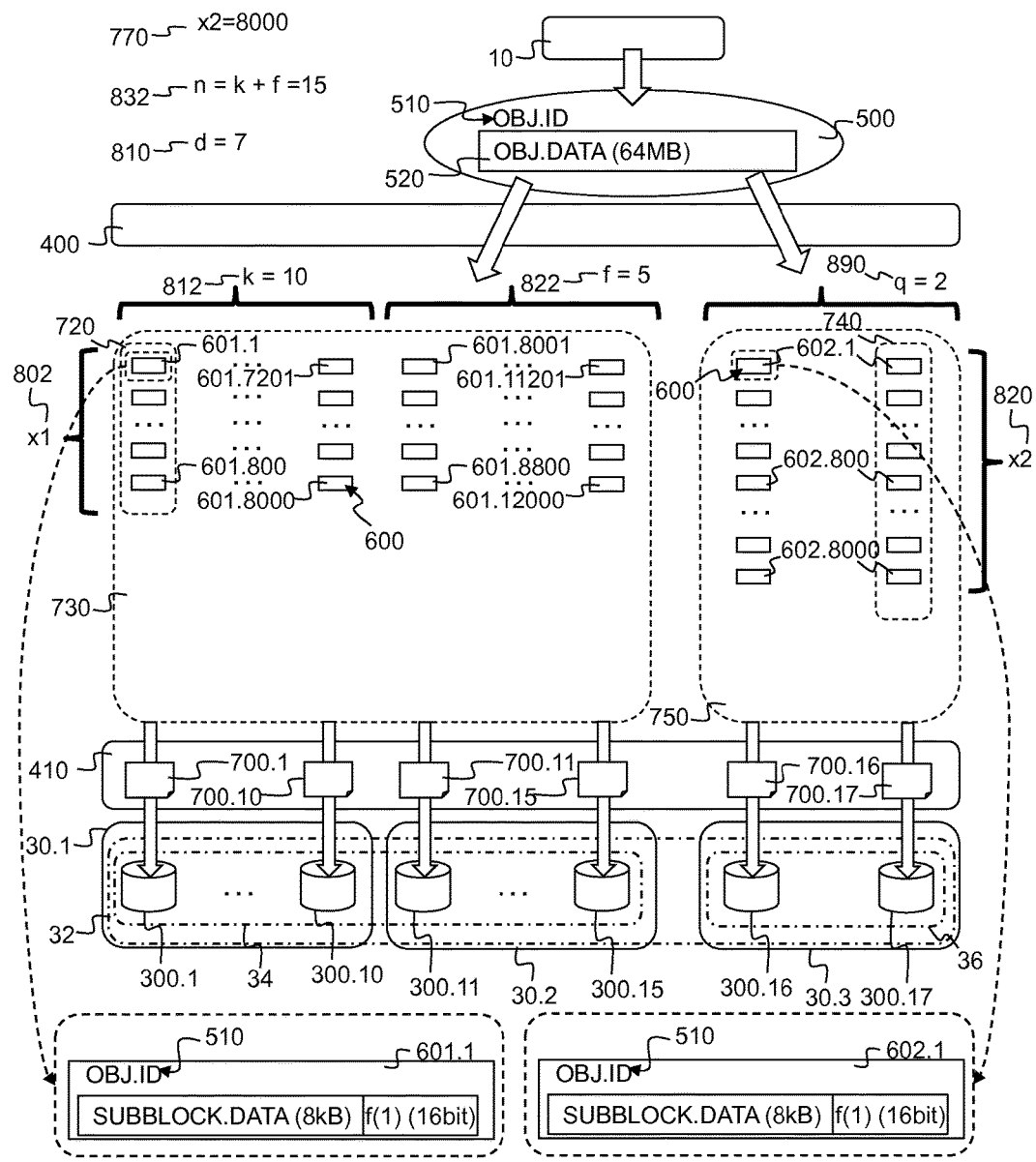

According to the embodiment shown in FIG. 10, storage set 32 comprises the level-1 fragment storage subset 34 of storage elements 300.1-300.15 and the complementary level-2 fragment storage subset 36 with storage elements 300.16 and 300.17. The basic fragment count 770 again corresponds to $x1*k=800*10=8000$. The hybrid encoding module 400 will disassemble the data object 500 into an encoding number $x1*n=8000*15=12000$ of redundant level-1 fragments 601, i.e. fragments 601.1-601.12000. The fragment spreading width n=15 consists of the sum of a basic level-1 fragment storage element count k=10 and a redundant level-1 fragment storage element count f=S. In this embodiment, the hybrid encoding module 400 generates a level-2 encoding multiple equal to the basic fragment count, i.e. $x2=b=8000$ of level-2 fragments for each storage element of the level-2 fragment storage subset 36, i.e. storage elements 300.16 and 300.17. Level-2 fragments 602.1-602.8000 are generated and stored on both storage element 300.16 and 300.17. In this embodiment, the decoding module is adapted to generate the data object 500 from any combination of at least the basic fragment count (i.e. 8000) of level-1 fragments 601 or level-2 fragments 602 retrieved by the clustering module. In this embodiment, a data object can be retrieved from a single storage element 300.16 or 300.17, e.g. by retrieving the $x2=b=8000$ of level-2 fragments 602.1-602.8000 from storage element 300.16 of level-2 fragment storage subset 36. It is clear that according to this embodiment of the distributed object storage system, 1 GB of data objects 500 being processed by the hybrid encoding module will result in a need for a storage capacity of 1.5 GB+2*1 GB=3.5 GB, wherein two times the basic fragment count b=8000 of level-2 fragments for the data object 500 is stored, corresponding to 2*1 GB=2 GB. For a data object 500 of 64 MB, this results in a need for storage capacity of 64 MB*1.5+64 MB*2=224 MB. This corresponds to a storage overhead of 250% or a storage cost of 350%.

Figure 11:
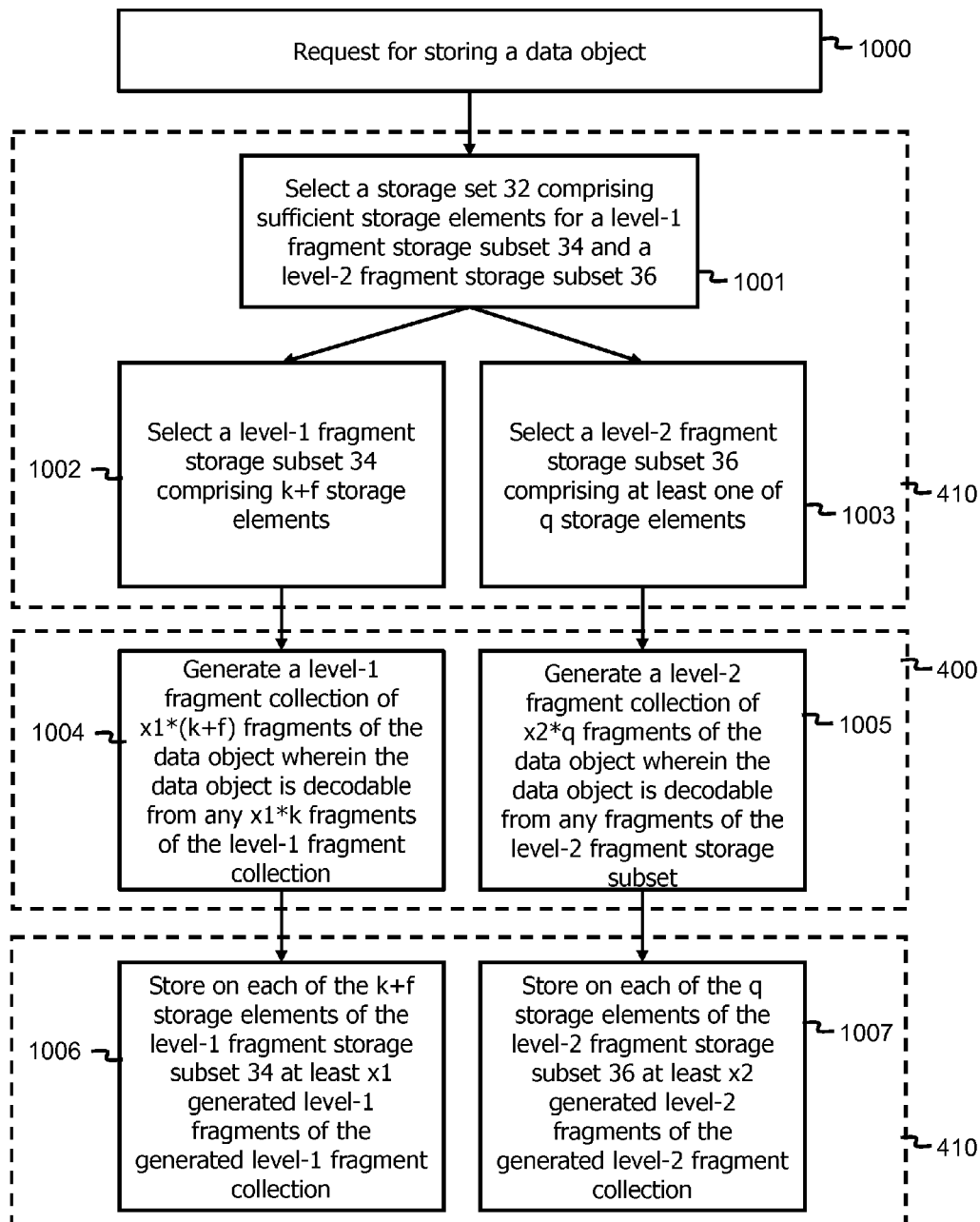
FIG. 11 illustrates an embodiment of a method for operating a distributed storage system, according to the techniques described herein.

As shown in FIG. 11, the distributed storage system 1 can be operated according to a hybrid storage and retrieval option, i.e. according to the method illustrated by the steps 1000-1007 of FIG. 11, such that the desired concurrent failure tolerance 810, also referenced above as d, of concurrent failures of the storage elements 300 of the storage set 32 can be tolerated, which could for example be seven as mentioned above, but also any other suitable plurality such as for example four, five, six, eight or more.

After a request is received for storing a data object in step 1000. A storage set 32 is selected at step 1001 comprising sufficient storage elements 300 for a level-1 fragment storage subset 34 and a level-2 fragment storage subset 36. Preferably the level-1 fragment storage subset 34 comprises the largest number of storage elements 300 and thus the storage subset 32 thus comprises at least a sufficient number of storage elements 300 for this level-1 fragment storage subset 34, optionally increased at least partially by the number of storage elements for a level-2 fragment storage subset 36 when there is no overlap.

At step 1002 a level-1 fragment storage subset 34 comprising the desired number k+f of storage elements 300 is also selected by the spreading module 410. At step 1003 the level-2 fragment storage subset 36 comprising the desired number q of one or more storage elements 300 is selected by the spreading module 410.

In step 1005, the hybrid encoding module 400 generates a level-2 fragment collection 750 of x2*q level-2 fragments of the data object 500. As in this embodiment, the data object 500 is decodable from any basic fragment count 770 of level-1 fragments 601 and/or level-2 fragments 602 of the level-2 fragment storage subset 36. In the particular embodiment wherein the level-1 fragment storage subset 34 comprises the level-2 fragment storage subset 36, the data object 500 is decodable from any basic fragment count 770 of level-1 fragments 601 and level-2 fragments 602 of the level-2 fragment storage subset 36. Therefore, per storage element 300 of the level-2 fragment storage element count q of storage elements 300 of the level-2 fragment storage subset 36, each corresponding level-2 fragment sub-collection 740 of level-2 fragments allows the decoding of the data object 500. As explained above, q is preferably equal to one as this results in the most optimal scenario with respect to storage cost for the hybrid storage and retrieval option. But alternative embodiments are possible, in which level-2 fragment storage element count q is for example two, or even more, as long as preferably in general the number of q is smaller than the desired concurrent failure tolerance d.

Next to the generation of a level-2 fragment collection 750, as explained above, at step 1004 a level-1 fragment collection 730 of x1*(k+f) level-1 fragments of the data object 500 is generated by the hybrid encoding module 400. Herein the data object 500 is decodable from any x1*k level-1 fragments 601 of the level-1 fragment collection 730.

On the level-2 fragment storage subset 36 comprising the desired number q of one or more storage elements 300 selected in step 1003, the spreading module 410, then stores at least a level-2 encoding multiple x2 generated level-2 fragments of the generated level-2 fragment collection 750 on each storage element 300 of the level-2 fragment storage subset 36 at step 1007. Also on the level-1 fragment storage subset 34 comprising k+f storage elements 300 selected in step 1002, the spreading module 410 in step 1006 then stores on each of the k+f storage elements 300 of the level-1 fragment storage subset 34 at least x1 generated fragments 601 of the generated level-1 fragment collection 730.

Figure 12:
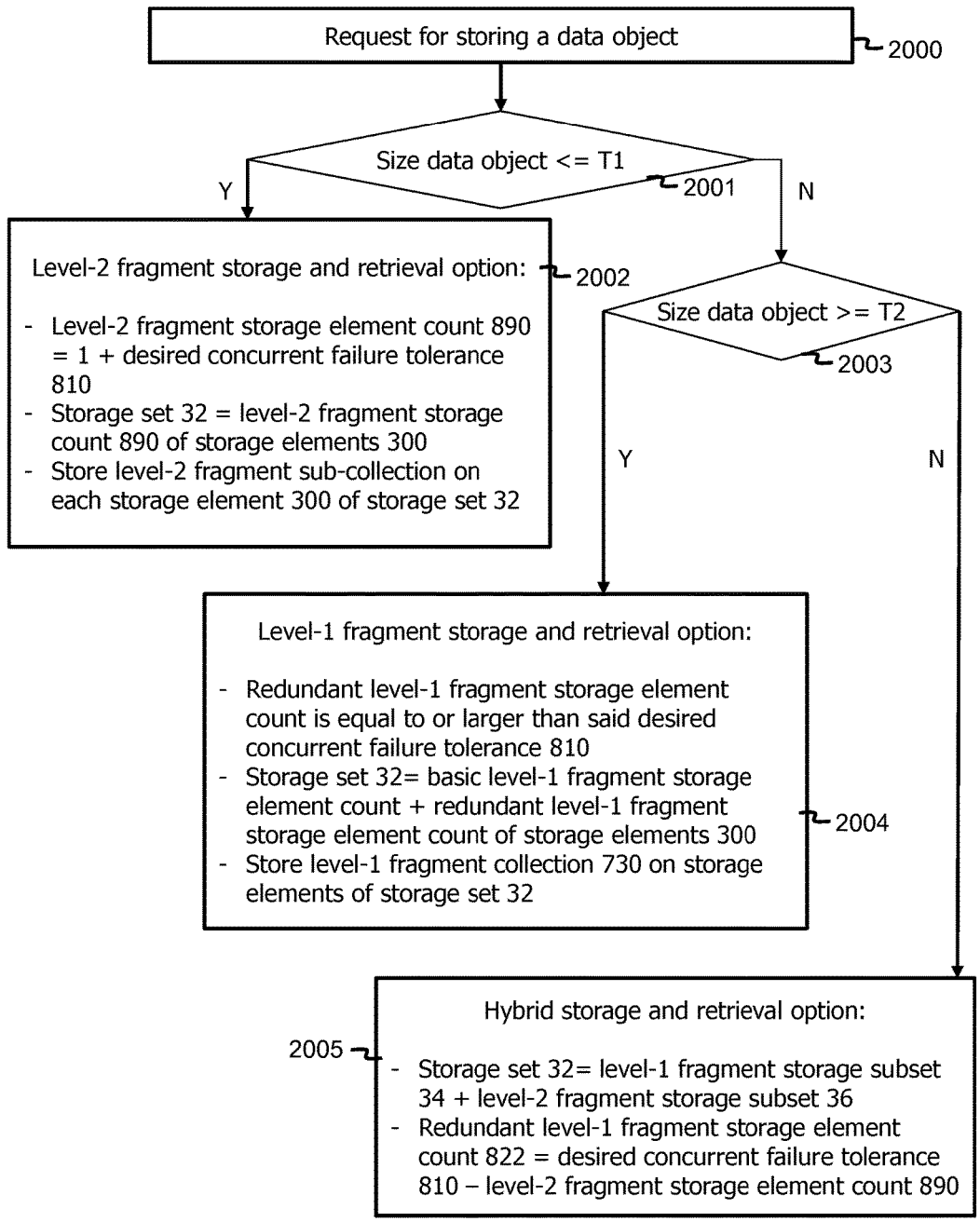
FIG. 12 shows a further embodiment of a method of operating such a distributed storage system, according to the techniques described herein.

According to a further embodiment, such as for example shown in FIG. 12, the distributed data storage system 1, can additionally also be operated according to a level-2 fragment storage and retrieval option when the size of the data object 500 is smaller than or equal to a first data object size threshold T1, e.g. 64 kB or any other suitable threshold for relatively small data objects. In that case, when a request for storing a data object 500 is received at step 2000, in step 2001 the process will be continued to step 2002 and level-2 fragment sub-collections 740 of level-2 encoding multiple x2 level-2 fragments of the data object 500, are generated and stored on each storage element 300 of the selected storage set 32, wherein the data object 500 is decodable from a level-2 encoding multiple x2 of level-2 fragments. The storage set 32 comprises a level-2 fragment storage element count 890 of storage elements 300 that is equal to the sum of one plus the desired concurrent failure tolerance. With a desired concurrent failure tolerance of seven as described in the example above the storage set 32 would thus comprise eight storage elements 300 on which then x2 level-2 fragments of the data object 500 are stored. Hereby, a data object can be decoded and retrieved from each storage element 300 of the selected storage set 32.

In an alternative embodiment, in the level-2 fragment storage and retrieval option, the hybrid encoding can be adapted to generate a level-2 fragment storage element count of replication copies of the data object, the spreading module can be adapted to store one of replication copy generated by the hybrid encoding module on each redundant storage element of the storage set, the clustering module can be adapted to retrieve one of the replication copies stored by the spreading module on the storage set and the decoding module can be adapted to generate the data object from the replication copy retrieved by the clustering module. Such an option is preferable for such small data objects as the overhead associated with generation, storage and retrieval and decoding the large number of even smaller fragments is avoided. Additionally this reduces the negative impact of the effect of the block size of a file system on the storage elements 300, for example for a file system comprising a block size of 4 kB, this negative impact will be already relevant for data objects smaller than 128 kB, for an encoding scheme with a basic level-1 fragment storage element count k=10 and a redundant level-1 fragment storage element count f=6, this becomes a critical issue for data objects smaller than 64 kB and certainly for data objects with a size of less than ten times the block size of 4 kB.

According to the embodiment shown in FIG. 12, the distributed data storage system 1, can also be operated according to a level-1 fragment storage and retrieval option when the size of the data object 500 is greater than to a second data object size threshold T2, e.g. 1 GB or any other suitable threshold for relatively large data objects. It is clear that the second data object size threshold T2 is preferably several orders of magnitude greater than the first data object size threshold T1. In that case, when storing a data object, the method proceeds from step 2000 via step 2001 and to step 2003 and to step 2004, where a level-1 fragment collection 730 is generated, wherein a level-1 fragment sub-collection 720 of level-1 fragments 601 is stored on each storage element 300 of the selected storage set 32, in a similar way as described above. Hereby, a data object 500 is decodable from any combination of retrieved level-1 fragments 601 of which the number corresponds to a basic fragment count 760. However now the redundant level-1 fragment storage element count will be equal to or greater than the desired concurrent failure tolerance which according to the example described above is for example seven. When similar as described above the basic level-1 fragment storage element count is for example equal to ten, the storage set 32 will comprise a set of seventeen storage elements 300 among which the fragment collection 730 will be distributed so that each of these storage elements comprises a fragment sub-collection 720 comprising for example 800 level-1 fragments as described above, so that a concurrent failure of seven storage elements can be tolerated. Such an option is preferable for such very large data objects as an optimal use is made of the parallel bandwidth of these storage elements and their network connection during storage and retrieval operations and the use of storage capacity is further optimized and more efficient as with an encoding rate of r=k/n=10/17, the storage cost will only be a factor of 1.7. This thus means that the storage cost will only be 170% or the storage overhead will only be 70%.

It is further also clear that according to the embodiment of FIG. 12, when the size of the data object 500 is in the range between the first data object size threshold T1 and the second data object size threshold T2, the method will proceed from step 2000 along step 2001, to step 2003 and to 2005 to a hybrid storage and retrieval option with a storage set 32 comprising a level-1 fragment storage subset 34 and a level-2 fragment storage subset. As described in more detail with respect to FIGS. 5 to 10, according to an embodiment where the level-2 fragment storage subset 36 does not overlap with the level-1 fragment storage subset 34, the redundant level-1 fragment storage element count 822 will be equal to the desired concurrent failure tolerance 810 minus the level-2 fragment storage element count 890. Preferably the level-2 fragment storage element count 890 is then equal to one or two as in this way the effect on the storage cost is minimized, while additionally the number of input output operations during a subsequent retrieval operation is minimized without compromising the level of desired concurrent failure tolerance.

It is clear that different embodiments of methods of operation are possible then the one described above with reference to FIG. 12, as long as in general the hybrid storage and retrieval option as described above is present. Although the embodiment of FIG. 12 presents further improvements with respect to particularly small or large data objects, even when only using the hybrid storage and retrieval option data objects of any size will be processed with a desired level of efficiency even when the distributed storage system is subject to varying loads with respect to the network bandwidth, input output operations, etc. According to embodiments of the hybrid storage and retrieval option in which the level-1 fragments and level-2 fragments are generated concurrently and subsequently spread concurrently, this will automatically result in the fastest response time for a subsequent retrieval operation irrespective of the size of the data object or the particular load condition of the distributed storage system. According to an alternative embodiment in which for example first a basic fragment count of level-2 fragments is generated or attempted to be retrieved this results in a particularly simple embodiment in which processing power needed for decoding fragments can be allocated to one or more storage elements 300 of the level-2 fragment storage subset 36, thereby not occupying other storage elements 300. It is clear that still further embodiments are possible with specific advantages.

According to a further embodiment, the desired concurrent failure tolerance 810 can be chosen differently for respectively the level-2 fragment storage and retrieval option, the hybrid storage and retrieval option and the level-1 fragment storage and retrieval option. For example, when the distributed storage system 1 is operated according to the level-2 fragment storage and retrieval option, the level-2 fragment storage element count 890 can for example be chosen equal to three. For this option, the desired concurrent failure tolerance 810 consequently equals two. For a small file with size 10 kB, the storage overhead would be 200%, corresponding to 20 kB. It is clear that the storage cost would then be a factor of three or 300%. When the system is operated according to the hybrid storage and retrieval option, the desired concurrent failure tolerance 810 can be chosen for example equal to four, wherein the redundant level-1 fragment storage element count 822 equals three and the level-2 fragment storage element count 890 equals one. For a medium file with size 10 MB, the storage overhead would then be 143% (i.e. 3/7+1), corresponding to 14.3 MB. It is clear that the storage cost would then be a factor of 2.43 or 243%. When the system is operated according to the level-1 fragment storage and retrieval option, the desired concurrent failure tolerance 810 can be chosen for example equal to five, wherein the redundant level-1 fragment storage element count 822 consequently equals five. For a large file with size 10 GB, the storage overhead would be 28% (i.e. 5/18), corresponding to 2.8 GB. It is clear that the storage cost would then be a factor of 1.28 or 128%.

It is clear that in a particular embodiment, each level-1 fragment and each level-2 fragment corresponds to a fragment of a data object with the same data size, which is encoded according to the same encoding/decoding scheme, e.g. via a forward error correction code, an erasure code, a rateless erasure code, etc. It is self-evident that in alternative embodiments, level-1 fragments and level-2 fragments can be chosen and/or generated according to a different encoding/decoding scheme.

It is further clear that, as described with reference to the embodiments above, preferably said level-2 fragment storage element count is smaller than said redundant level-1 fragment storage element count, as in this way the storage cost related to a desired concurrent failure tolerance for the distributed storage system operated according to the hybrid storage and retrieval option is often optimized. However, it is clear that according to further alternative embodiments, the redundant level-1 fragment storage element count could also be equal to or smaller than the level-2 storage element count.

It is clear that in general the method and system described above can largely be implemented as a computer program comprising software code adapted to perform this method when executed by a processor of suitable computing system, such as for example a suitable server or a general purpose computer.

Although the present disclosure has been illustrated by reference to specific embodiments, it will be apparent to those skilled in the art that the disclosure is not limited to the details of the foregoing illustrative embodiments, and that the present disclosure may be embodied with various changes and modifications without departing from the scope thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any references in the claims shall not be construed as limiting the respective claims concerned. The terms or references "first", "second", third", . . . ; "A", "B", "C", . . . ; "1", "2", "3", . . . ; "a", "b", "c", . . . ; "i", "ii", "iii", . . . , and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosure are capable of operating according to the present disclosure in other sequences, or in orientations different from the one(s) described or illustrated above.

What is claimed is:

1. A distributed object storage system comprising:
a plurality of storage nodes, wherein:
each storage node comprises a share of a plurality of storage elements of the distributed object storage system;
the plurality of storage elements is adapted to redundantly store and retrieve a data object on a storage set; and
the storage set comprises two or more storage elements of the plurality of storage elements; and
at least one controller node coupled to or at least partly comprised within the plurality of storage nodes, the at least one controller node including a spreading module configured to:
determine a desired concurrent failure tolerance of concurrent failures of storage elements of the storage set;
select a level-1 fragment storage subset comprising a fragment spreading width of the storage elements of the storage set, the fragment spreading width being a sum of:
a basic level-1 fragment storage element count corresponding to a number of storage elements of the level-1 fragment storage subset which are not allowed to fail, and
a redundant level-1 fragment storage element count corresponding to a number of storage elements of the level-1 fragment storage subset which are allowed to concurrently fail;
select a level-2 fragment storage subset comprising a level-2 fragment storage element count, which is equal to or greater than one, of the storage elements of the storage set, wherein:
a sum of the redundant level-1 fragment storage element count and the level-2 fragment storage element count is equal to or greater than the desired concurrent failure tolerance,
the basic level-1 fragment storage element count exceeds the level-2 fragment storage element count, and
the data object is decodable from the level-2 fragment storage subset;
store, on each storage element of the level-1 fragment storage subset, a level-1 fragment sub-collection comprising at least a level-1 encoding multiple of level-1 fragments generated by a hybrid encoding module; and
store, on each storage element of the level-2 fragment storage subset, a level-2 fragment sub-collection comprising at least a level-2 encoding multiple of level-2 fragments generated by the hybrid encoding module;
wherein the hybrid encoding module is configured to:
generate a level-1 fragment collection comprising at least the level-1 encoding multiple multiplied by the fragment spreading width of level-1 fragments of the data object; and
generate a level-2 fragment collection comprising at least the level-2 encoding multiple multiplied by the level-2 fragment storage element count of level-2 fragments of the data object; and
wherein the at least one controller node is configured to determine a basic fragment count of one or more of level-1 fragments and level-2 fragments from one or more of the level-1 fragment storage subset and the level-2 fragment storage subset from which the data object is decodable.

2. The distributed object storage system according to claim 1, further comprising:
a clustering module configured to:
retrieve at least the basic fragment count of one or more of the level-1 fragments and the level-2 fragments stored by the spreading module from one or more of the level-1 fragment storage subset and the level-2 fragment storage subset from which the data object is decodable; and
a decoding module configured to respectively:
generate the data object from a number of fragments that is a combination of one or more of the level-1 fragments and the level-2 fragments retrieved by the clustering module of which the number of fragments is at least the basic fragment count.

3. The distributed object storage system according to claim 1, wherein the basic fragment count is equal to the basic level-1 fragment storage element count multiplied by the level-1 encoding multiple.

4. The distributed object storage system according to claim 3, wherein the level-2 encoding multiple is equal to the basic fragment count divided by the level-2 fragment storage element count.

5. The distributed object storage system according to claim 3, wherein the level-2 encoding multiple is equal to the basic fragment count.

6. The distributed object storage system according to claim 1, wherein:
the level-2 fragment storage element count is smaller than the redundant level-1 fragment storage element count; and the redundant level-1 fragment storage element count is greater than or equal to three.

7. The distributed object storage system according to claim 1, wherein:

the level-2 fragment storage element count is equal to one or two; and the redundant level-1 fragment storage element count is greater than or equal to three.

8. The distributed object storage system according to claim 1, wherein:

the level-1 fragment storage subset comprises the level-2 fragment storage subset; and the desired concurrent failure tolerance is equal to the redundant level-1 fragment storage element count.

9. The distributed object storage system according to claim 8, wherein the level-2 encoding multiple is equal to a ratio between the basic fragment count and the level-2 fragment storage element count, minus the level-1 encoding multiple.

10. The distributed object storage system according to claim 1, wherein:

the level-1 fragment storage subset and the level-2 fragment storage subset do not overlap; and the redundant level-1 fragment storage element count is equal to the desired concurrent failure tolerance minus the level-2 fragment storage element count.

11. The distributed object storage system according to claim 2, wherein the clustering module is further configured to:

attempt to retrieve at least the basic fragment count of the one or more of the level-1 fragments and the level-2 fragments stored by the spreading module from the level-2 fragment storage subset; and responsive to the attempt to retrieve at least the basic fragment count of the one or more of the level-1 fragments and the level-2 fragments from the level-2 fragment storage subset failing, further attempt to retrieve at least the basic fragment count of the level-1 fragments stored by the spreading module from the level-1 fragment storage subset.

12. The distributed object storage system according to claim 1, wherein the hybrid encoding module is further configured to first generate at least the basic fragment count of one or more of level-1 fragments and level-2 fragments of the data object for storage on the level-2 fragment storage subset.

13. The distributed object storage system according to claim 12, wherein the spreading module is further configured to first store at least the basic fragment count of the one or more of the level-1 fragments and the level-2 fragments on the level-2 fragment storage subset as soon as it is generated by the hybrid encoding module.

14. The distributed object storage system according to claim 1, wherein, to operate according to a level-2 fragment storage and retrieval option:

the hybrid encoding module is further configured to generate the level-2 fragment collection comprising at least the level-2 encoding multiple multiplied by the level-2 fragment storage element count of level-2 fragments of the data object, the level-2 fragment collection being configured such that the data object is decodable from any combination of the level-2 fragments, wherein a number of the level-2 fragments in any combination of the level-2 fragments corresponds to the basic fragment count;

the spreading module is further configured to:

select the storage set comprising a basic level-2 fragment storage element count of the storage elements of the storage set; and store, on each storage element of the storage set, the level-2 fragment sub-collection comprising at least the level-2 encoding multiple of level-2 fragments generated by the hybrid encoding module;

a clustering module is configured to retrieve at least the basic fragment count of level-2 fragments stored by the spreading module from the storage set from which the data object is decodable; and a decoding module is configured to generate the data object from a combination of level-2 fragments retrieved by the clustering module of which a number of level-2 fragments is at least the basic fragment count.

15. The distributed object storage system according to claim 14, wherein the distributed object storage system is operated according to the level-2 fragment storage and retrieval option responsive to a size of said data object being smaller than or equal to a predetermined first data object size threshold.

16. The distributed object storage system according to claim 1, wherein, to operate according to a level-1 fragment storage and retrieval option:

the hybrid encoding module is further configured to generate the level-1 fragment collection comprising at least the level-1 encoding multiple multiplied by the fragment spreading width of level-1 fragments of the data object, the level-1 fragment collection being configured such that the data object is decodable from any combination of a number of level-1 fragments of which the number of level-1 fragments corresponds to the basic fragment count which corresponds to the basic level-1 fragment storage element count multiplied by the level-1 encoding multiple;

the spreading module is further configured to:

select the storage set comprising the fragment spreading width of the storage elements of the storage set, the fragment spreading width being the sum of:

the basic level-1 fragment storage element count corresponding to a number of storage elements of the storage set which are not allowed to fail, and the redundant level-1 fragment storage element count corresponding to a number of storage elements of the storage set which are allowed to concurrently fail, whereby the redundant level-1 fragment storage element count is equal to or greater than the desired concurrent failure tolerance; and store on each storage element of the storage set the level-1 fragment sub-collection comprising at least the level-1 encoding multiple of level-1 fragments generated by the hybrid encoding module;

a clustering module is configured to retrieve at least the basic fragment count of the level-1 fragments stored by the spreading module from the storage set; and a decoding module is configured to generate the data object from a combination of level-1 fragments retrieved by the clustering module of which the number of level-1 fragments is at least the basic fragment count.

17. The distributed object storage system according to claim 16, wherein the distributed object storage system is operated according to the level-1 fragment storage and retrieval option responsive to a size of the data object being greater than a predetermined second data object size threshold.

18. The distributed object storage system according to claim 1, wherein the distributed object storage system is operated according to a hybrid storage and retrieval option responsive to a size of the data object being greater than a predetermined first data object size threshold and being smaller than or equal to a predetermined second data object size threshold, the predetermined second data object size threshold being greater than the predetermined first data object size threshold.

19. A method of operating a distributed storage system, the method comprising:
   determining a desired concurrent failure tolerance of concurrent failures of storage elements of a storage set;
   selecting, by a spreading module, a level-1 fragment storage subset comprising a fragment spreading width of the storage elements of the storage set, the fragment spreading width being a sum of:
      a basic level-1 fragment storage element count corresponding to a number of storage elements of the level-1 fragment storage subset which are not allowed to fail, and
      a redundant level-1 fragment storage element count corresponding to a number of storage elements of the level-1 fragment storage subset which are allowed to concurrently fail;
   selecting, by the spreading module, a level-2 fragment storage subset comprising a level-2 fragment storage element count, which is equal to or greater than one, of the storage elements of the storage set, whereby a sum of the redundant level-1 fragment storage element count and the level-2 fragment storage element count is equal to or greater than the desired concurrent failure tolerance, wherein the basic level-1 fragment storage element count exceeds the level-2 fragment storage element count, and wherein a data object is decodable from the level-2 fragment storage subset;
   determining a basic fragment count of one or more of level-1 fragments and level-2 fragments stored by the spreading module from one or more of the level-1 fragment storage subset and the level-2 fragment storage subset from which the data object is decodable;
   generating, by a hybrid encoding module, a level-1 fragment collection comprising at least a level-1 encoding multiple multiplied by the fragment spreading width of level-1 fragments of the data object; and a level-2 fragment collection comprising at least a level-2 encoding multiple multiplied by the level-2 fragment storage element count of level-2 fragments of the data object;
   storing, on each storage element of the level-1 fragment storage subset, a level-1 fragment sub-collection comprising at least the level-1 encoding multiple of level-1 fragments generated by the hybrid encoding module; and
   storing, on each storage element of the level-2 fragment storage subset, a level-2 fragment sub-collection comprising at least the level-2 encoding multiple of level-2 fragments generated by the hybrid encoding module.

20. The method according to claim 19, further comprising decoding the data object from any combination of one or more of the level-1 fragments and the level-2 fragments of which a number of the one or more of the level-1 fragments and the level-2 fragments corresponds to at least the basic fragment count.

21. A distributed object storage system comprising:
   a plurality of storage nodes, wherein:
      each storage node comprises a share of a plurality of storage elements of the distributed object storage system;
      the plurality of storage elements is adapted to redundantly store and retrieve a data object on a storage set; and
      the storage set comprises two or more storage elements of the plurality of storage elements;
   means for determining a desired concurrent failure tolerance of concurrent failures of storage elements from the two or more storage elements of the storage set;
   means for selecting a level-1 fragment storage subset comprising a fragment spreading width of the storage elements of the storage set, the fragment spreading width being a sum of:
      a basic level-1 fragment storage element count corresponding to a number of storage elements of the level-1 fragment storage subset which are not allowed to fail; and
      a redundant level-1 fragment storage element count corresponding to a number of storage elements of the level-1 fragment storage subset which are allowed to concurrently fail;
   means for selecting a level-2 fragment storage subset comprising a level-2 fragment storage element count, which is equal to or greater than one, of the storage elements of the storage set, wherein:
      a sum of the redundant level-1 fragment storage element count and the level-2 fragment storage element count is equal to or greater than the desired concurrent failure tolerance;
      the basic level-1 fragment storage element count exceeds the level-2 fragment storage element count; and
      the data object is decodable from the level-2 fragment storage subset;
   means for storing, on each storage element of the level-1 fragment storage subset, a level-1 fragment sub-collection comprising at least a level-1 encoding multiple of level-1 fragments generated by a hybrid encoding module;
   means for storing, on each storage element of the level-2 fragment storage subset, a level-2 fragment sub-collection comprising at least a level-2 encoding multiple of level-2 fragments generated by the hybrid encoding module;
   means for generating a level-1 fragment collection comprising at least the level-1 encoding multiple multiplied by the fragment spreading width of level-1 fragments of the data object;
   means for generating a level-2 fragment collection comprising at least the level-2 encoding multiple multiplied by the level-2 fragment storage element count of level-2 fragments of the data object; and
   means for determining a basic fragment count of one or more of level-1 fragments and level-2 fragments from one or more of the level-1 fragment storage subset and the level-2 fragment storage subset from which the data object is decodable.

* * * * *

UNITED STATES PATENT AND TRADEMARK OFFICE
CERTIFICATE OF CORRECTION

PATENT NO.         : 10,241,872 B2
APPLICATION NO.    : 14/814264
DATED              : March 26, 2019
INVENTOR(S)        : Frederik De Schrijver et al.

Page 1 of 1

It is certified that error appears in the above-identified patent and that said Letters Patent is hereby corrected as shown below:

On the Title Page

Item (73) Assignee should read:
Western Digital Technologies, Inc.
San Jose, California Signed and Sealed this
Thirty-first Day of December, 2019

Andrei Iancu
*Director of the United States Patent and Trademark Office*